(12) United States Patent
Ogawa et al.

(10) Patent No.: US 7,392,797 B2
(45) Date of Patent: Jul. 1, 2008

(54) EGR FAILURE DETERMINATION SYSTEM AND CONTROL SYSTEM FOR INTERNAL COMBUSTION ENGINE

(75) Inventors: Ken Ogawa, Saitama-ken (JP); Toru Kitamura, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 115 days.

(21) Appl. No.: 11/526,804

(22) Filed: Sep. 26, 2006

(65) Prior Publication Data

US 2007/0144502 A1 Jun. 28, 2007

(30) Foreign Application Priority Data

| Sep. 30, 2005 | (JP) | ............................. 2005-288058 |
| Sep. 30, 2005 | (JP) | ............................. 2005-288059 |

(51) Int. Cl.
- *F02M 25/07* (2006.01)
- *F02B 47/08* (2006.01)
- *F02D 41/14* (2006.01)

(52) U.S. Cl. ............................ 123/568.14; 123/568.16; 123/568.21

(58) Field of Classification Search ... 123/90.15–90.18, 123/316, 568.11, 568.14, 568.16, 568.21, 123/698; 701/101–103, 108, 109, 114, 115; 73/117.3, 118.1; 60/278, 285, 605.2
See application file for complete search history.

(56) References Cited

U.S. PATENT DOCUMENTS

| 6,330,870 | B1 * | 12/2001 | Inoue et al. .............. 123/90.17 |
| 6,802,302 | B1 * | 10/2004 | Li et al. .................. 123/568.16 |
| 6,957,642 | B2 * | 10/2005 | Miura .................... 123/568.16 |
| 7,104,248 | B2 * | 9/2006  | Weiss ......................... 123/305 |
| 7,314,041 | B2 * | 1/2008  | Ogawa et al. .......... 123/568.14 |
| 2001/0035172 | A1 * | 11/2001 | Osaki et al. ............ 123/568.16 |
| 2003/0106367 | A1 | 6/2003 | Osaki et al. |
| 2005/0056265 | A1 | 3/2005 | Center |
| 2005/0161029 | A1 | 7/2005 | Ishikawa |
| 2006/0272625 | A1 * | 12/2006 | Wang .................... 123/568.16 |
| 2007/0074505 | A1 * | 4/2007 | Ogawa et al. ................ 60/285 |
| 2007/0074707 | A1 * | 4/2007 | Ogawa et al. .......... 123/568.14 |

FOREIGN PATENT DOCUMENTS

| EP | 1 239 142 A2 | 9/2002 |
| JP | 1-163450 A | 6/1989 |
| JP | 2003-148181 A | 5/2003 |
| JP | 2004-360548 A | 12/2004 |

* cited by examiner

*Primary Examiner*—Willis R Wolfe, Jr.
(74) *Attorney, Agent, or Firm*—Arent Fox LLP.

(57) ABSTRACT

An EGR failure determination system for an internal combustion engine, which is capable of accurately determining failures of both an external EGR device and an internal EGR device, irrespective of whether the EGR amount is large or small, thereby making it possible to enhance marketability of the system. The EGR failure determination system includes an ECU. The ECU calculates an actual fresh air ratio, and sets a target value thereof. Further, it calculates a feedback correction coefficient according to the actual fresh air ratio and the target value, and controls an exhaust recirculation mechanism and three variable mechanism. When the feedback correction coefficient is not within a predetermined range, and if it is larger than 0.5, at least one of the three variable mechanism is determined to be faulty, whereas if it is not larger than 0.5, the exhaust recirculation mechanism is determined to be faulty.

9 Claims, 25 Drawing Sheets

| AP\NE | NE1 | ......... | NEj |
|---|---|---|---|
| AP1 | PMCMD11 | ......... | PMCMD1j |
| ⋮ | ⋮ | ⋱ | ⋮ |
| APi | PMCMDi1 | ......... | PMCMDij |

FIG. 19

| NE\PMCMD | NE1 ········· NEj |
|---|---|
| PMCMD1 | KEGRCMD11 ········· KEGRCMD1j |
| ⋮ | ⋮               ⋮ |
| PMCMDi | KEGRCMDi1 ········· KEGRCMDij |

FIG. 20

| NE\PMCMD | NE1 ········· NEj |
|---|---|
| PMCMD1 | EGRDIVIN11 ········· EGRDIVIN1j |
| ⋮ | ⋮               ⋮ |
| PMCMDi | EGRDIVINi1 ········· EGRDIVINij |

| NE<br>PMCMD | NE1 | ......... | NEj |
|---|---|---|---|
| PMCMD1 | KCMDMAP11 | ......... | KCMDMAP1j |
| ⋮ | ⋮ | | ⋮ |
| PMCMDi | KCMDMAPi1 | ......... | KCMDMAPij |

FIG. 24

| NE \ KEGRMAPIN | KEGRMAPIN1 · · · · · · · · · · KEGRMAPINj |
|---|---|
| NE1 | SAAEXCMD11 · · · · · · · · · SAAEXCMD1j |
| ⋮ | ⋮           ⋮           ⋮ |
| NEi | SAAEXCMDi1 · · · · · · · · · SAAEXCMDij |

FIG. 25

| NE \ KEGRMAPIN | KEGRMAPIN1 · · · · · · · · · · KEGRMAPINj |
|---|---|
| NE1 | CAEXCMD11 · · · · · · · · · CAEXCMD1j |
| ⋮ | ⋮           ⋮           ⋮ |
| NEi | CAEXCMDi1 · · · · · · · · · CAEXCMDij |

F I G. 2 6

| NE \ KEGRMAPIN | KEGRMAPIN1 · · · · · · · · · KEGRMAPINj |
|---|---|
| NE1 | CAINCMD11 · · · · · · · · · CAINCMD1j |
| ⋮ | ⋮ |
| NEi | CAINCMDi1 · · · · · · · · · CAINCMDij |

F I G. 2 7

| HPBGA \ KEGRMAPEX | KEGRMAPEX1 · · · · · · · · · KEGRMAPEXj |
|---|---|
| HPBGA1 | LCMD11 · · · · · · · · · LCMD1j |
| ⋮ | ⋮ |
| HPBGAi | LCMDi1 · · · · · · · · · LCMDij |

EGR FAILURE DETERMINATION SYSTEM AND CONTROL SYSTEM FOR INTERNAL COMBUSTION ENGINE

BACKGROUND OF THE INVENTION

1. Field of the Invention

This invention relates to a control system and an EGR failure determination system for an internal combustion engine that has an internal EGR amount and an external EGR amount changed by an internal EGR device and an external EGR device, respectively, the control system controlling the internal EGR amount, the external EGR amount, and so forth, and the EGR failure determination system determining failures of the EGR devices.

2. Description of the Related Art

Conventionally, a control system for an internal combustion engine including an EGR failure determination system have been disclosed in Japanese Laid-Open Patent Publication (Kokai) No. 2004-360548. This internal combustion engine is provided with a variable intake cam phase mechanism and an exhaust recirculation mechanism. When the variable intake cam phase mechanism varies the phase of an intake valve relative to a crankshaft of the engine (hereinafter referred to as "the cam phase"), the valve overlap is changed to change the amount of combustion gases remaining in a cylinder of the engine (hereinafter referred to as "the internal EGR amount"). Further, the exhaust recirculation mechanism includes an EGR passage extending between an exhaust passage and an intake passage, and an EGR control valve for opening and closing the EGR passage. In the exhaust recirculation mechanism, by changing the degree of opening of the EGR control valve (hereinafter referred to as "the EGR opening"), the amount of gases recirculated from the exhaust passage to the intake passage (hereinafter referred to as "the external EGR amount") is changed.

The above EGR failure determination system includes an EGR control system. The EGR control system controls sets a target cam phase as a target of the cam phase and a target EGR opening as a target of the EGR opening are set according to operating conditions of the engine, and controls the internal EGR amount by the variable intake cam phase mechanism such that the cam phase becomes equal to the target cam phase, and the external EGR amount by the EGR control valve such that the EGR opening becomes equal to the target EGR opening.

Further, the EGR failure determination system compares the absolute value of the difference between the EGR opening and the target EGR opening with a predetermined value, and determines that a failure has occurred in which the EGR control valve is stuck at an open state, when the absolute value of the difference is not smaller than the predetermined value.

Furthermore, when the EGR failure determination system has determined that the EGR control valve is faulty, the EGR control system sets the target cam phase to a value of 0, whereby the cam phase is controlled to a value for minimizing the valve overlap by the variable intake cam phase mechanism. That is, the internal EGR amount is controlled such that it becomes minimum.

The above-described conventional control system carries out failure determination only of a failure in which the EGR control valve is stuck at an open state, that is, a failure in which the external EGR amount is too large, and when such a failure has occurred, the internal EGR amount is only controlled such that it becomes minimum, by the variable intake cam phase mechanism. Therefore, when a failure has occurred in which the external EGR amount decreases to be too small, the total EGR amount becomes so low to make knocking liable to occur, resulting in deteriorated drivability. This problem can become conspicuous particularly during high-load operation of the engine.

According to the above-described conventional EGR failure determination system, the failure of the EGR control valve is determined by comparing the absolute value of the difference between the EGR opening and the target EGR opening with the predetermined value, and hence when the EGR rate is small and the external EGR amount is small, the accuracy of the determination is lowered, which can bring about an error in the determination. That is, the EGR failure determination system can carry out failure determination with accuracy only in a region where the external EGR amount is large, which lowers the marketability of the system.

Further, no failure determination is carried out of the variable intake cam phase mechanism, and therefore when the variable intake cam phase mechanism is faulty, the internal EGR amount is controlled to an improper value by the EGR control system, which results in degraded combustion of the engine. Furthermore, when the EGR failure determination system determines that the EGR control valve is faulty, the EGR control system controls the internal EGR amount by the variable intake cam phase mechanism such that the internal EGR amount becomes minimum, so that knocking is liable to occur during high-load operation of the engine.

SUMMARY OF THE INVENTION

It is a first object of the present invention to provide an EGR failure determination system for an internal combustion engine, which is capable of accurately determining failures of both an external EGR device and an internal EGR device, irrespective of whether the EGR amount is large or small, thereby making it possible to enhance marketability of the system.

It is a second object of the present invention to provide a control system for an internal combustion engine, which is capable of suppressing occurrence of knocking even when a failure has occurred in which the external EGR amount becomes smaller, thereby making it possible to enhance drivability.

To attain the first object, in a first aspect of the present invention, there is provided an EGR failure determination system for an internal combustion engine including an external EGR device that recirculates exhaust gases emitted from a cylinder into the cylinder and changes a recirculation amount of the exhaust gases, and an internal EGR device that causes combustion gases generated in the cylinder to remain as a high-temperature gas higher in temperature than the exhaust gases and changes a remaining amount of the combustion gases, the EGR failure determination system determining failures of the external EGR device and the internal EGR device, comprising:

EGR rate parameter-calculating means for calculating an EGR rate parameter indicative of a ratio of a total EGR amount which is a sum of an amount of the exhaust gases recirculated into the cylinder and an amount of the combustion gases remaining in the cylinder, to a total gas amount which is a sum of the total EGR amount and an amount of fresh air drawn into the cylinder, according to a first operating condition parameter indicative of an operating condition of the engine;

target value-setting means for setting a target value as a target of the EGR rate parameter;

EGR control value-calculating means for calculating an EGR control value according to the EGR rate parameter and the target value;

control means for controlling the external EGR device and the internal EGR device according to the EGR control value; and failure determination means for determining that at least one of the external EGR device and the internal EGR device is faulty when the EGR control value is not within a predetermined range.

With the configuration of the EGR failure determination system according to the first aspect of the present invention, the EGR control value is calculated according to the EGR rate parameter and its target value, and the external EGR device and the internal EGR device are controlled according to the EGR control value. Further, when a state in which the EGR control value is not within the predetermined range has continued for a time period longer than a predetermined time period, it is determined that the external EGR device and/or the internal EGR device are/is faulty. As described above, by comparing the EGR control value with the predetermined range, failure determination of the external EGR device and/or the internal EGR device is carried out, and the EGR control value is calculated according to the EGR rate parameter and its target value, so that differently from the conventional EGR failure determination system which compares the absolute value of the difference between the EGR opening and the target EGR opening with a predetermined value, it is possible to accurately determine failures or a failure of the external EGR device and/or the internal EGR device even when the EGR amount is small. That is, irrespective of whether the EGR amount is large or small, it is possible to accurately determine the failures or failure of the external EGR device and/or the internal EGR device, thereby making it possible to secure high marketability (it should be noted that throughout the present specification, "to cause combustion gases to remain in the cylinder" is intended to mean not only to cause the combustion gases to remain in the cylinder, but also to recirculate the combustion gases into the cylinder e.g. via a combustion gas supply passage through the cylinder head, as a high-temperature gas higher in temperature than exhaust gases recirculated by the external EGR device).

Preferably, the EGR failure determination system further comprises EGR ratio-setting means for setting a ratio of an amount of exhaust gases to be recirculated into the cylinder by the external EGR device to the total EGR amount, as an external EGR ratio, and a ratio of an amount of combustion gases to be caused to remain in the cylinder by the internal EGR device to the total EGR amount, as an internal EGR ratio, according to a second operating condition parameter indicative of an operating condition of the engine, the control means controlling the external EGR device further according to the external EGR ratio and controls the internal EGR device further according to the internal EGR ratio, and when the EGR control value is not within the predetermined range, if the external EGR ratio is larger than the internal EGR ratio, the failure determination means determines that the external EGR device is faulty, whereas if the internal EGR ratio is larger than the external EGR ratio, the failure determination means determines that the internal EGR device is faulty.

With the configuration of the preferred embodiment, when the EGR control value is not within the predetermined range, if the external EGR ratio is larger than the internal EGR ratio, it is determined that the external EGR device is faulty, whereas if the internal EGR ratio is larger than the external EGR ratio, it is determined that the internal EGR device is faulty. The external EGR ratio and the internal EGR ratio are set as the respective ratios of the amount of gases to be recirculated into the cylinder by the external EGR device and the amount of gases to be recirculated into the cylinder by the internal EGR device, to the total EGR amount, and the external EGR device is controlled further according to the external EGR ratio, whereas the internal EGR device is controlled further according to the internal EGR ratio. Therefore, by comparing the magnitudes of the external EGR ratio and the internal EGR ratio with each other, it is possible to identify which of the failures of the external EGR device and the internal EGR device mainly causes the state in which the EGR control value is not within the predetermined range. That is, differently from the conventional EGR failure determination system, it is possible to accurately identify which of the EGR devices is faulty, thereby making it possible to enhance workability during maintenance to further enhance the marketability.

More preferably, the EGR failure determination system further comprises learned value-calculating means for calculating a learned value of the EGR control value for external EGR, when the external EGR ratio is larger than the internal EGR ratio and at the same time not smaller than a first predetermined value, and calculating a learned value of the EGR control value for internal EGR, when the internal EGR ratio is larger than the external EGR ratio and at the same time not smaller than a second predetermined value, and the failure determination means determines that the external EGR device is faulty, when the calculated learned value of the EGR control value for external EGR is not within a first predetermined range, and determines that the internal EGR device is faulty, when the calculated learned value of the EGR control value for internal EGR is not within a second predetermined range.

With the configuration of the preferred embodiment, the learned value of the EGR control value for external EGR is calculated when the external EGR ratio is larger than the internal EGR ratio and at the same time not smaller than the first predetermined value, and the learned value of the EGR control value for internal EGR is calculated when the internal EGR ratio is larger than the external EGR ratio and at the same time not smaller than the second predetermined value. Further, when the learned value of the EGR control value for external EGR is not within the first predetermined range, it is determined that the external EGR device is faulty, and when the learned value of the EGR control value for internal EGR is not within the second predetermined range, it is determined that the internal EGR device is faulty. Thus, the two learned value of the EGR control value are compared with the two predetermined ranges, respectively, to thereby determine the respective failures of the external EGR and the internal EGR. Therefore, differently from the conventional EGR failure determination system which compares the absolute value of the difference between the EGR opening and the target EGR opening with the predetermined value, it is possible to accurately determine the failures of the external EGR device and the internal EGR device even when the EGR amount is small. In addition, by setting the first predetermined value to such a value at which the external EGR ratio is by far larger than the internal EGR ratio, and the second predetermined value to such a value at which the internal EGR ratio is by far larger than the external EGR ratio, it is possible to accurately identify which is faulty, the external EGR device or the internal EGR device is faulty. As a result, the failure determination of the external EGR device and the internal EGR device can be performed by two different failure determination methods, and the faulty device can be identified. This makes it possible to perform more accurate failure determination to thereby further enhance the accuracy of the determination.

To attain the first object, in a second aspect of the present invention, there is provided an EGR failure determination system for an internal combustion engine including an external EGR device that recirculates exhaust gases emitted from a cylinder into the cylinder and changes a recirculation amount of the exhaust gases, and an internal EGR device that causes combustion gases generated in the cylinder to remain as a high-temperature gas higher in temperature than the exhaust gases and changes a remaining amount of the combustion gases, the EGR failure determination system determining failures of the external EGR device and the internal EGR device, comprising EGR rate parameter-calculating means for calculating an EGR rate parameter indicative of a ratio of a total EGR amount which is a sum of an amount of the exhaust gases recirculated into the cylinder and an amount of the combustion gases remaining in the cylinder, to a total gas amount which is a sum of the total EGR amount and an amount of fresh air drawn into the cylinder, according to a first operating condition parameter indicative of an operating condition of the engine, target value-setting means for setting a target value as a target of the EGR rate parameter, EGR control value-calculating means for calculating an EGR control value according to the EGR rate parameter and the target value, EGR ratio-setting means for setting a ratio of an amount of exhaust gases to be recirculated into the cylinder by the external EGR device to the total EGR amount, as an external EGR ratio, and a ratio of an amount of combustion gases to be caused to remain in the cylinder by the internal EGR device to the total EGR amount, as an internal EGR ratio, according to a second operating condition parameter indicative of an operating condition of the engine, control means for controlling the external EGR device according to the EGR control value and the external EGR ratio, and controlling the internal EGR device according to the EGR control value and the internal EGR ratio, learned value-calculating means for calculating a learned value of the EGR control value for external EGR, when the external EGR ratio is larger than the internal EGR ratio and at the same time not smaller than a first predetermined value, and calculating a learned value of the EGR control value for internal EGR, when the internal EGR ratio is larger than the external EGR ratio and at the same time not smaller than a second predetermined value, and failure determination means for determining that the external EGR device is faulty, when the calculated learned value of the EGR control value for external EGR is not within a first predetermined range, and determining that the internal EGR device is faulty, when the calculated learned value of the EGR control value for internal EGR is not within a second predetermined range.

With the configuration of the EGR control system according to the second aspect of the present invention, the EGR control value is calculated according to the EGR rate parameter and its target value, and the external EGR ratio and the internal EGR ratio are set as the respective ratios of the amount of gases to be recirculated into the cylinder by the external EGR device and the amount of gases to be recirculated into the cylinder by the internal EGR device, to the total EGR amount, as well as the external EGR device is controlled according to the EGR control value and the external EGR ratio and the internal EGR device is controlled according to the EGR control value and the internal EGR ratio. Further, the learned value of the EGR control value for external EGR is calculated when the external EGR ratio is larger than the internal EGR ratio and at the same time not smaller than the first predetermined value, and the learned value of the EGR control value for internal EGR is calculated when the internal EGR ratio is larger than the external EGR ratio and at the same time not smaller than the second predetermined value. Further, when the learned value of the EGR control value for external EGR is not within the first predetermined range, it is determined that the external EGR device is faulty, and when the learned value of the EGR control value for internal EGR is not within the second predetermined range, it is determined that the internal EGR device is faulty.

Thus, the two learned value of the EGR control value are compared with the two predetermined ranges, respectively, to thereby determine the failures of the external EGR and the internal EGR. Therefore, differently from the conventional EGR failure determination system which compares the absolute value of the difference between the EGR opening and the target EGR opening with the predetermined value, it is possible to accurately determine the failures of the external EGR device and the internal EGR device, irrespective of whether the EGR amount is large or small. In addition, if the first predetermined value is set to such a value at which the external EGR ratio is by far larger than the internal EGR ratio, and the second predetermined value is set to such a value at which the internal EGR ratio is by far larger than the external EGR ratio, it is possible to accurately determine which is faulty, the external EGR device or the internal EGR device. From the above, it is possible to enhance the marketability.

Preferably, the engine is formed by an engine capable of performing at least compression ignition combustion operation, the EGR failure determination system further comprising inhibiting means for inhibiting the compression ignition combustion operation of the engine when the failure determination means has determined that at least one of the external EGR device and the internal EGR device is faulty.

In general, when the compression ignition combustion operation of the engine is performed, which requires highly accurate control of in-cylinder temperature in combustion of a mixture, if the compression ignition combustion operation is performed in a state in which one of the external EGR device and the internal EGR device is faulty, it is impossible to properly control the in-cylinder temperature, which can degrade combustion of the mixture. With the configuration of the preferred embodiment, however, when it is determined that one of the external EGR device and the internal EGR device is faulty, the compression ignition combustion operation is inhibited in the engine which is capable of performing at least the compression ignition combustion operation. This makes it possible to avoid degradation of combustion of the mixture by the compression ignition combustion operation.

To attain the second object, in a third aspect of the present invention, there is provided a control system for an internal combustion engine including an external EGR device that recirculates exhaust gases emitted from a cylinder into the cylinder and changes a recirculation amount of the exhaust gases, and an internal EGR device that causes combustion gases generated in the cylinder to remain as a high-temperature gas higher in temperature than the exhaust gases and changes a remaining amount of the combustion gases, comprising EGR control means for controlling the external EGR device and the internal EGR device, according to a first operating condition parameter indicative of an operating condition of the engine, external EGR failure determination means for determining whether or not a failure in which the recirculation amount of the exhaust becomes smaller has occurred in the external EGR device, target air-fuel ratio-setting means for setting a target air-fuel ratio as a target of an air-fuel ratio of a mixture in the engine according to a second operating condition parameter indicative of an operating condition of the engine, and setting the target air-fuel ratio to a failure-time target air-fuel ratio leaner than a value set according to the second operating condition parameter, when the external EGR failure determination means determines that the external EGR device is faulty, and air-fuel ratio control means for controlling the air-fuel ratio of the mixture according to the set target air-fuel ratio.

With the configuration of the EGR control system according to the third aspect of the present invention, the air-fuel ratio of the mixture is controlled according to the target air-fuel ratio which is normally set according to the second operating condition parameter indicative of an operating condition of the engine. When it is determined that a failure in which the recirculation amount of the exhaust becomes smaller has occurred in the external EGR device, the target air-fuel ratio is set to the failure-time target air-fuel ratio leaner than the value set according to the second operating condition parameter. More specifically, when the recirculation amount of the exhaust becomes smaller by the failure of the external EGR device, the air-fuel ratio of the mixture is controlled to a leaner value than when the external EGR device is normal, such that a leaner mixture than when the external EGR device is normal is supplied to the cylinder. Therefore, differently from the conventional control system, it is possible to suppress occurrence of knocking. Particularly even during high-load operation of the engine, occurrence of knocking can be suppressed, thereby making it possible to enhance the drivability.

Preferably, the EGR control means comprises target EGR rate parameter-setting means for setting a target EGR rate parameter which serves as a target of a value indicative of a ratio of a total EGR amount which is a sum of an amount of the exhaust gases recirculated into the cylinder and an amount of the combustion gases remaining in the cylinder, to a total gas amount which is a sum of the total EGR amount and an amount of fresh air drawn into the cylinder, according to the first operating condition parameter, EGR control value-calculating means for calculating an EGR control value for controlling the external EGR device and the internal EGR device according to the set target EGR rate parameter, and EGR ratio-setting means for setting a ratio of an amount of exhaust gases to be recirculated into the cylinder by the external EGR device to the total EGR amount as an external EGR ratio, and a ratio of an amount of combustion gases to be caused to remain in the cylinder by the internal EGR device to the total EGR amount as an internal EGR ratio, according to a third operating condition parameter indicative of an operating condition of the engine, and controls the external EGR device according to the external EGR ratio and the EGR control value, and controls the internal EGR device according to the internal EGR ratio and the EGR control value, and when the EGR control value is not within a predetermined range, if the external EGR ratio is larger than the internal EGR ratio, the external EGR failure determination means determines that the failure in which the recirculation amount of the exhaust becomes smaller has occurred in the external EGR device.

With the configuration of the preferred embodiment, when the EGR control value is not within the predetermined range, if the external EGR ratio is larger than the internal EGR ratio, it is determined that the failure in which the recirculation amount of the exhaust becomes smaller has occurred in the external EGR device. The EGR control value is for controlling the external EGR device and the internal EGR device, and is calculated according to the target EGR rate parameter which serves as the target of the value indicative of the ratio of the total EGR amount which is the sum of the amount of the exhaust gases recirculated into the cylinder and the amount of the combustion gases remaining in the cylinder, to the total gas amount which is the sum of the total EGR amount and the amount of fresh air drawn into the cylinder. The external EGR device is controlled according to the external EGR ratio and the EGR control value, and the internal EGR device is controlled according to the internal EGR ratio and the EGR control value. Accordingly, when the external EGR ratio is larger than the internal EGR ratio, it can be estimated that the state in which the EGR control value is not within the predetermined range is caused by the failure of the external EGR device, so that by properly setting the predetermined range, it is possible to accurately determine that the failure in which the recirculation amount of the exhaust becomes smaller has occurred in the external EGR device.

Preferably, the EGR control means includes target EGR rate parameter-setting means for setting a target EGR rate parameter which serves as a target of a value indicative of a ratio of a total EGR amount which is a sum of an amount of the exhaust gases recirculated into the cylinder and an amount of the combustion gases remaining in the cylinder, to a total gas amount which is a sum of the total EGR amount and an amount of fresh air drawn into the cylinder, according to the first operating condition parameter, and controls the external EGR device and the internal EGR device according to the set target EGR rate parameter, and when the external EGR failure determination means has determined that the external EGR device is faulty, the target air-fuel ratio-setting means sets the failure-time target air-fuel ratio according to the target air-fuel ratio set according to the second operating condition parameter and the target EGR rate parameter.

With the configuration of the preferred embodiment, the external EGR device and the internal EGR device are controlled according to the target EGR rate parameter, and when it is determined that the failure in which the recirculation amount of the exhaust becomes smaller has occurred in the external EGR device, the failure-time target air-fuel ratio is set according to the target air-fuel ratio set according to the second operating condition parameter and the target EGR rate parameter. In this case, the target EGR rate parameter is set as the target of the value indicative of the ratio of the total EGR amount which is the sum of the amount of the exhaust gases recirculated into the cylinder and the amount of the combustion gases remaining in the cylinder, to the total gas amount which is the sum of the total EGR amount and the amount of fresh air drawn into the cylinder. Therefore, by setting the failure-time target air-fuel ratio according to the ratio of the total EGR amount to the total gas amount, which is indicated by the target EGR rate parameter, and the target air-fuel ratio set according to the second operating condition parameter, it is possible to set the failure-time target air-fuel ratio to a leaner value which is capable of positively making up for shortage of recirculated gas amount, caused by the failure of the external EGR device, thereby making it possible to positively suppress occurrence of knocking. As a result, it is possible to further enhance drivability.

Preferably, the target air-fuel ratio-setting means includes demanded output-setting means for setting a demanded output of the engine according to the second operating condition parameter, and setting the demanded output to a predetermined limit value when the external EGR failure determination means has determined that the external EGR device is faulty, and the target air-fuel ratio-setting means sets the target air-fuel ratio according to the set demanded output, and when the external EGR failure determination means has determined that the external EGR device is faulty, sets the failure-time target air-fuel ratio according to the predetermined limit value.

With the configuration of the preferred embodiment, the demanded output of the engine is set according to the second operating condition parameter. When it is determined that the failure in which the recirculation amount of the exhaust gases becomes smaller has occurred in the external EGR device, the demanded output is set to the predetermined limit value. The target air-fuel ratio is set according to the demanded output, and when it is determined that the failure in which the recirculation amount of the exhaust becomes smaller has occurred in the external EGR device, the failure-time target air-fuel ratio is set according to the predetermined limit value. Therefore, by properly setting the predetermined limit value, it is possible to set the failure-time target air-fuel ratio to a leaner value which makes knocking difficult to occur. This makes it possible to suppress occurrence of knocking more positively even during high-load operation of the engine, whereby it is possible to enhance drivability.

The above and other objects, features, and advantages of the present invention will become more apparent from the following detailed description taken in conjunction with the accompanying drawings.

BRIEF DESCRIPTION OF THE DRAWINGS

FIG. 19 is a view of an example of a map for use in calculation of a target value KEGRCMD;

FIG. 20 is a view of an example of a map for use in calculation of an internal EGR ratio EGRDIVIN;

FIG. 24 is a view of an example of a map for use in calculation of a target turning angle SAAEXCMD for a low-lift mode;

FIG. 25 is a view of an example of a map for use in calculation of a target exhaust cam phase CAEXCMD for the low-lift mode;

FIG. 26 is a view of an example of a map for use in calculation of a target intake cam phase CAINCMD for the low-lift mode;

FIG. 27 is a view of an example of a map for use in calculation of a target EGR lift LCMD;

DETAILED DESCRIPTION OF PREFERRED EMBODIMENTS

Figure 2:
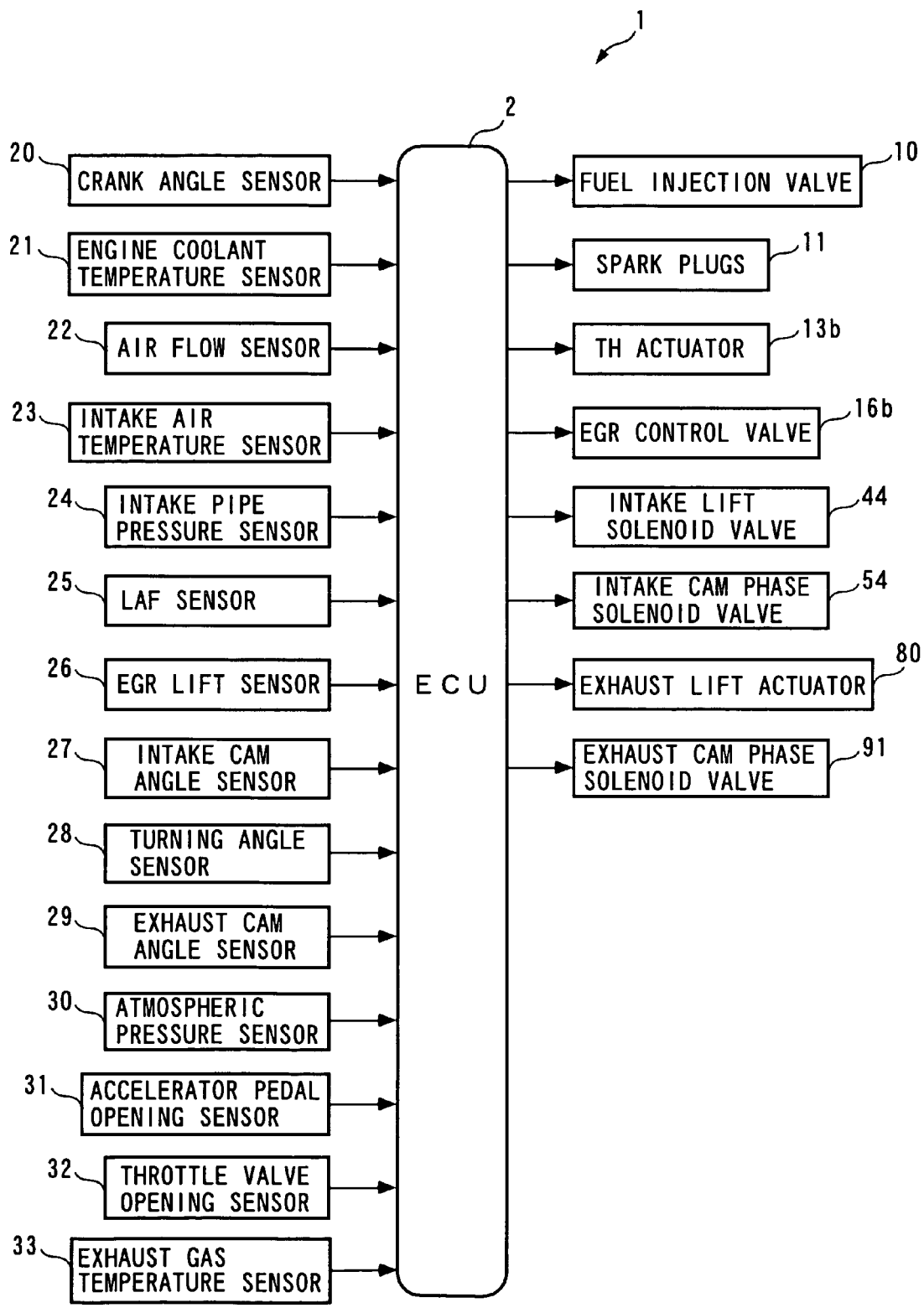
FIG. 2 is a schematic block diagram of the control system.

The present invention will now be described in detail with reference to the drawings showing a preferred embodiment thereof. FIG. 2 is a block diagram showing a control system 1 for an internal combustion engine (hereinafter referred to as "the engine") 3, according to the embodiment of the present invention. As shown in FIG. 2, the control system includes an ECU 2. The ECU 2 carries out control processes, as described hereinafter, including an EGR control process including an EGR failure determination process, depending on operating conditions of the engine 3.

Figure 1:
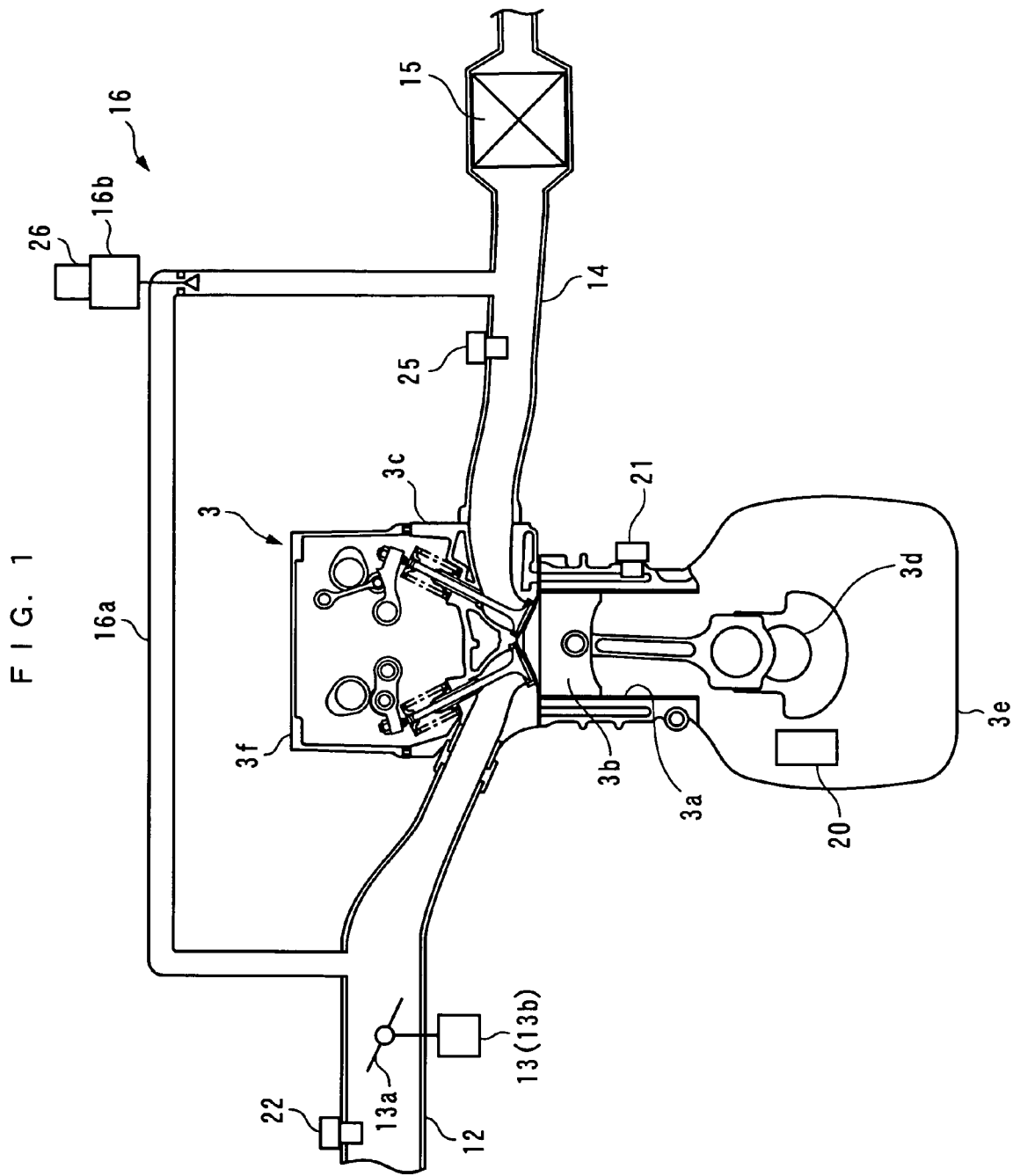
FIG. 1 is a schematic diagram of an internal combustion engine to which is applied a control system according to an embodiment of the present invention.
Figure 3:
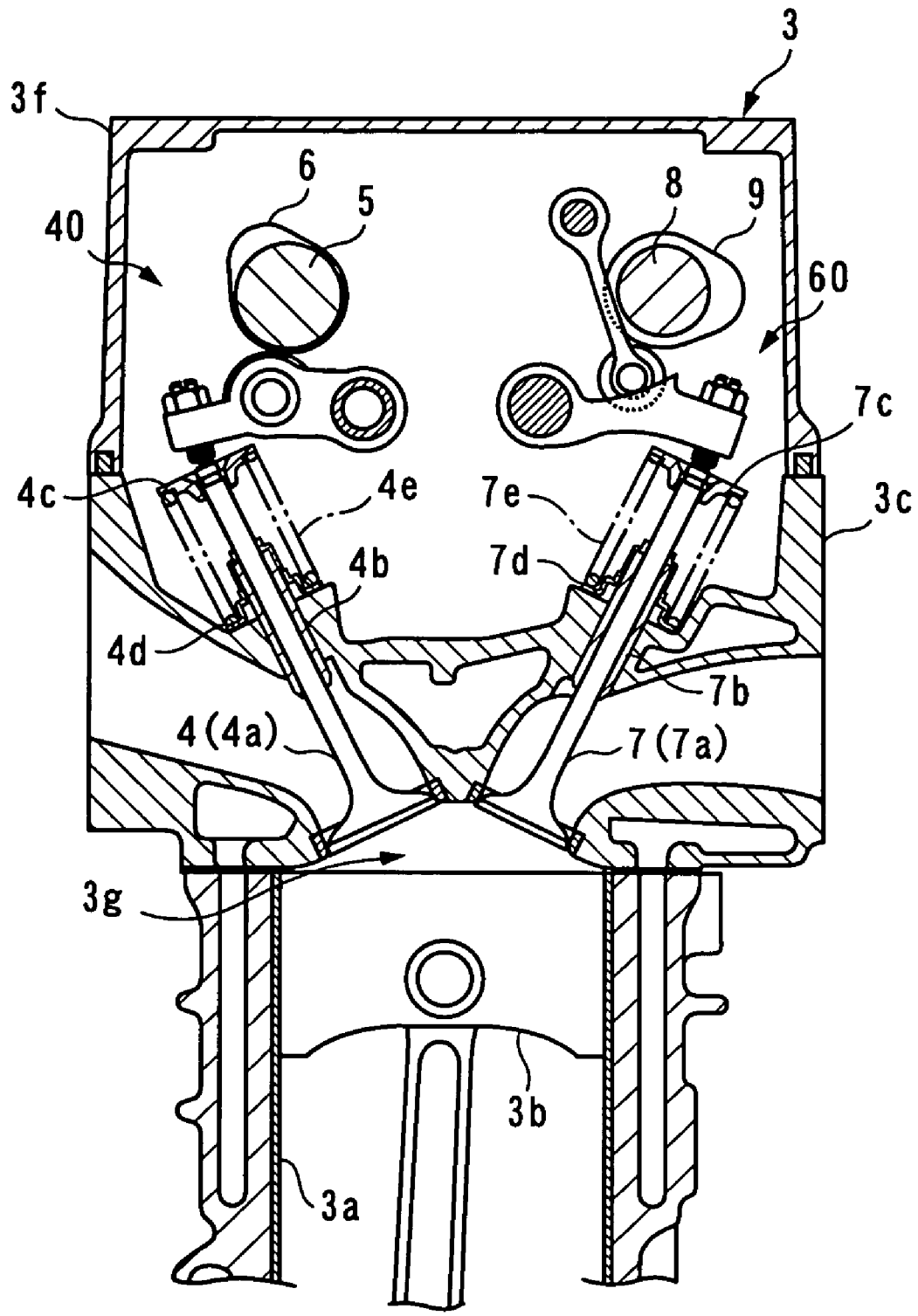
FIG. 3 is a schematic cross-sectional view of an intake-side valve actuating mechanism and an exhaust-side valve actuating mechanism of the engine.

As shown in FIGS. 1 and 3, the engine 3 is an inline four-cylinder gasoline engine installed on an automotive vehicle, not shown, and has four pairs (only one of which is shown) of cylinders 3*a* and respective pistons 3*b* associated therewith. Further, the engine 3 has a combustion chamber 3*g* defined between the piston 3*b* in each cylinder 3*a* and a cylinder head 3*c*.

Figure 9:
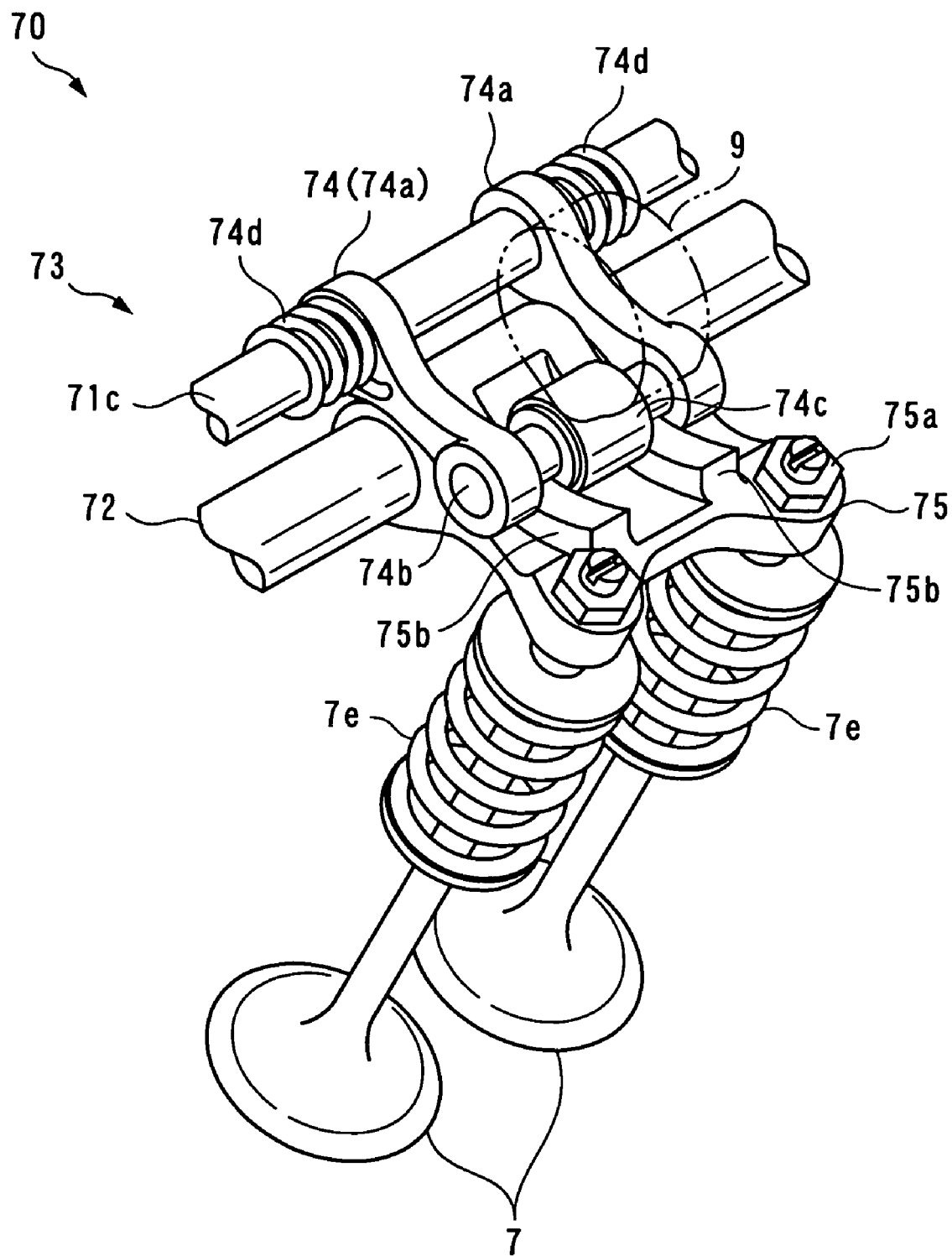
FIG. 9 is a perspective view of a linkage of the variable exhaust lift mechanism.

The engine 3 includes, on a cylinder-by-cylinder basis, a pair of intake valves 4 and 4 (only one of which is shown) and a pair of exhaust valves 7 and 7 (see FIG. 9). Further, the engine 3 includes an intake-side valve actuating mechanism 40 comprised of an intake camshaft 5 and intake cams 6, for opening and closing the intake valves 4, an exhaust-side valve actuating mechanism 60 comprised of an exhaust camshaft 8 and exhaust cams 9, for opening and closing the exhaust valves 7, fuel injection valves 10 (see FIG. 2), and spark plugs 11 (see FIG. 2).

Each intake valve 4 has a stem 4a thereof slidably fitted in a guide 4b fixed to the cylinder head 3c. The intake valve 4 is urged in the valve-closing direction by upper and lower spring seats 4c and 4d and a valve spring 4e disposed therebetween.

The intake camshaft 5 and the exhaust camshaft 8 are rotatably mounted through the cylinder head 3c via respective holders, not shown, such that they extend in the direction of arrangement of the cylinders 3a. An intake sprocket, not shown, is coaxially mounted on one end of the intake camshaft 5 in a rotatable manner. The intake sprocket is connected to a crankshaft 3d by a timing chain, not shown, and to the intake camshaft 5 via a variable intake cam phase mechanism 50, described hereinafter. With this arrangement, the intake camshaft 5 rotates one turn per two turns of the crankshaft 3d.

The intake cams 6 are provided on the intake camshaft 5 for rotation in unison therewith. Each intake cam 6 is comprised of two low-speed cams and a single high-speed cam having a higher cam nose than that of the low-speed cam, which are provided in association with each cylinder 3a.

The intake-side valve actuating mechanism 40 is configured to open and close the intake valves 4 of each cylinder 3a by rotation of the intake camshaft 5 caused by rotation of the crankshaft 3d, and is implemented by a variable valve actuating mechanism that switches the lift of the intake valves 4 between two stages and continuously changes the valve timing of the intake valves 4. It should be noted that in the present embodiment, the term "the lift of the intake valves 4 (hereinafter referred to as "the intake lift")" represents the maximum lift of the intake valves 4.

Each exhaust valve 7 has a stem 7a thereof slidably fitted in a guide 7b fixed to the cylinder head 3c. The exhaust valve 7 includes upper and lower spring seats 7c and 7d and a valve spring 7e disposed therebetween, and is urged by the valve spring 7e in the valve-closing direction.

An exhaust sprocket, not shown, is coaxially mounted on one end of the exhaust camshaft 8 in a rotatable manner. The exhaust sprocket is connected to the crankshaft 3d by a timing chain, not shown, and to the exhaust camshaft 8 via a variable exhaust cam phase mechanism 90, described hereinafter. With this arrangement, the exhaust camshaft 8 rotates one turn per two turns of the crankshaft 3d. The exhaust cams 9 are provided on the exhaust camshaft 8 in association with the cylinders 3a, respectively, for rotation in unison with the exhaust camshaft 8.

The exhaust-side valve actuating mechanism 60 is configured to open and close the exhaust valves 7 of each cylinder 3a by rotation of the exhaust camshaft 8 caused by rotation of the crankshaft 3d, and is implemented by a variable valve actuating mechanism that continuously changes the lift and valve timing of the exhaust valves 7. In the present embodiment, the term "the lift of the exhaust valves 7 (hereinafter referred to as "the exhaust lift")" represents the maximum lift of the exhaust valves 7.

The fuel injection valves 10 are provided for the respective cylinders 3a, and are each mounted through an associated one of the cylinder heads 3c so as to inject fuel directly into the associated cylinders 3a. In short, the engine 3 is configured as a direct injection engine. Further, each of the fuel injection valves 10 is electrically connected to the ECU 2, and has its valve open time period and valve-opening timing, i.e. the fuel injection period and the fuel injection timing are controlled by the ECU 2 based on a fuel injection amount TOUT, referred to hereinafter.

The spark plugs 11 are also provided for the respective cylinders 3a, and are each mounted through an associated one of the cylinder heads 3c. Each of the spark plugs 11 is electrically connected to the ECU 2, and has its discharge state controlled by the ECU 2, for burning a mixture within an associated one of the combustion chambers 3g in ignition timing.

The engine 3 is provided with a crank angle sensor 20 and an engine coolant temperature sensor 21. The crank angle sensor 20 is formed by a combination of a magnet rotor and an MRE pickup, and delivers a CRK signal and a TDC signal, which are both pulse signals, to the ECU 2 in accordance with rotation of the crankshaft 3d.

Each pulse of the CRK signal is generated whenever the crankshaft rotates through a predetermined angle (e.g. 10°). The ECU 2 determines a rotational speed (hereinafter referred to as "the engine speed") NE of the engine 3, based on the CRK signal. In the present embodiment, the engine speed NE corresponds to first, second, and third operating condition parameters. The TDC signal indicates that the piston 3b has come to a predetermined crank angle position immediately before the TDC position at the start of the intake stroke, on a cylinder-by-cylinder basis, and each pulse of the TDC signal is generated whenever the crankshaft rotates through a predetermined angle.

The engine coolant temperature sensor 21 senses an engine coolant temperature TW which is the temperature of an engine coolant circulating through a cylinder block 3e of the engine 3, and delivers a signal indicative of the sensed engine coolant temperature TW to the ECU 2.

In an intake pipe 12 of the engine 3, there are arranged an air flow sensor 22 and a throttle valve mechanism 13 from upstream to downstream in the mentioned order at respective locations of the intake pipe 12. The air flow sensor 22 is formed by a hot-wire air flow meter, for detecting a flow rate GIN of fresh air (hereinafter referred to as "the fresh air flow rate GIN") flowing through the intake pipe 12, and delivers a signal indicative of the sensed fresh air flow rate GIN to the ECU 2. In the present embodiment, the fresh air flow rate GIN corresponds to the first operating condition parameter.

The throttle valve mechanism 13 includes a throttle valve 13a, and a TH actuator 13b that opens and closes the throttle valve 13a. The throttle valve 13a is pivotally disposed across an intermediate portion of the intake pipe 12 such that the throttle valve 13a is pivotally moved to change the degree of opening thereof, thereby changing the fresh air flow rate GIN within the intake pipe 12. The TH actuator 13b is implemented by a combination of a motor, not shown, connected to the ECU 2, and a gear mechanism, not shown, and is controlled by a TH control input U_TH, referred to hereinafter, from the ECU 2 to thereby change the degree of opening of the throttle valve 13a.

The throttle valve 13a has two springs (neither of which is shown) mounted thereto for urging the throttle valve 13a in the valve-opening direction and the valve-closing direction, respectively. As described in detail hereinafter, when the TH control input U_TH is set to a value of 0, or when the TH control input U_TH is not input to the TH actuator 13b, the throttle valve 13a is held at a predetermined initial valve opening degree by the urging forces of the two springs. The initial valve opening degree is set to a value (e.g. 6°) which corresponds to an almost fully-closed state but at the same time ensures an appropriate amount of intake air for idling or starting of the engine 3 during stoppage of the vehicle and for maintaining a low-speed traveling condition during travel of the same.

Further, an intake air temperature sensor 23 and an intake pipe pressure sensor 24 (see FIG. 2 for both of them) are disposed at respective locations downstream of the throttle valve mechanism 13 in the intake pipe 12. The intake air temperature sensor 23 senses a temperature (intake air temperature TA) of intake air flowing through the intake pipe 12 and delivers a signal indicative of the sensed intake air temperature TA to the ECU 2. The intake pipe pressure sensor 24 is implemented e.g. by a semiconductor pressure sensor, and detects a pressure PBA in the intake pipe 12 (hereinafter referred to as "the intake pipe pressure PBA"), to deliver a signal indicative of the sensed intake pipe pressure PBA to the ECU 2. This intake pipe pressure PBA is detected as absolute pressure. In the present embodiment, the intake pipe pressure PBA corresponds to the first operating condition parameter.

In an exhaust pipe 14 of the engine 3, there are arranged an LAF sensor 25 and a catalyst 15 from upstream to downstream in the mentioned order at respective locations of the exhaust pipe 14. The LAF sensor 25 is comprised of a zirconia layer and platinum electrodes, and detects the concentration of oxygen contained in exhaust gases linearly in a wide range of the air-fuel ratio ranging from a rich region to a lean region, to deliver to the ECU 2 a signal indicative of the sensed oxygen concentration. The ECU 2 calculates a detected air-fuel ratio KACT indicative of the air-fuel ratio in exhaust gases, based on the value of the signal from the LAF sensor 25. In this case, the detected air-fuel ratio KACT is calculated as an equivalent ratio.

Further, the engine 3 has an exhaust gas recirculation mechanism 16 (external EGR device). The exhaust gas recirculation mechanism 16 recirculates exhaust gases from the exhaust pipe 14 into the intake pipe 12, and is comprised of an EGR pipe 16a connecting between the intake pipe 12 and the exhaust pipe 14, and an EGR control valve 16b for opening and closing the EGR pipe 16a. One end of the EGR pipe 16a opens into the exhaust pipe 14 at a location upstream of the catalyst 15, and the other end of the same opens into the intake pipe 12 at a location downstream of the throttle valve mechanism 13.

The EGR control valve 16b is of a linear solenoid valve type which is configured such that the lift thereof (hereinafter referred to as "the EGR lift") changes linearly between the maximum value and the minimum value according to an EGR lift control input U_LIFT, referred to hereinafter, from the ECU 2, thereby changing the degree of opening of the EGR pipe 16a, i.e. an exhaust gas recirculation amount (hereinafter referred to as "the external EGR amount).

The EGR control valve 16b has an EGR lift sensor 26 mounted thereto. The EGR lift sensor 26 detects an actual EGR lift LACT of the EGR control valve 16b and delivers a signal indicative of the sensed EGR lift LACT to the ECU 2. The ECU 2 controls the external EGR amount by the EGR control valve 16b, as described in detail hereinafter, such that the EGR lift LACT converges to a target EGR lift LCMD. It should be noted that in the following description, recirculation of exhaust gases by the exhaust gas recirculation mechanism 16 is referred to as "external EGR".

Figure 4:
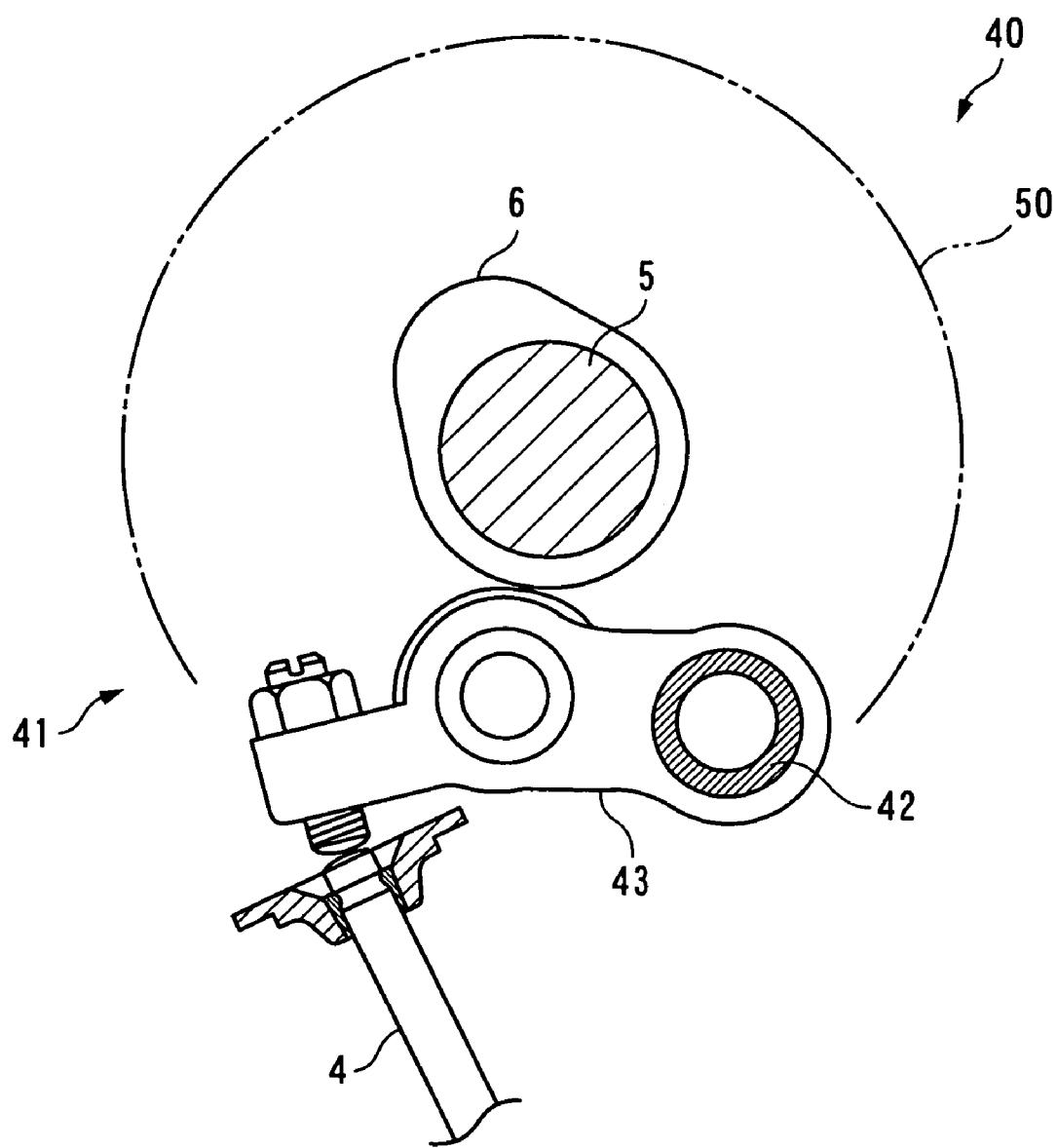
FIG. 4 is a schematic view of the intake-side valve actuating mechanism.

Next, a description will be given of the intake-side valve actuating mechanism 40. As shown in FIG. 4, the intake-side valve actuating mechanism 40 is comprised of the intake camshaft 5, the intake cams 6, an intake lift switching mechanism 41, and the variable intake cam phase mechanism 50.

The intake lift switching mechanism 41 is configured similarly to that proposed by the present assignee e.g. in Japanese Laid-Open Patent Publication (Kokai) No. 2000-227013, which is incorporated herein by reference, and therefore detailed description thereof is omitted. The intake lift switching mechanism 41 is comprised of a rocker-arm shaft 42, a set of low-speed rocker arms 43 and 43 (only one of which is shown) and a high-speed rocker arm, not shown, which set is pivotally fitted on the rocker-arm shaft 42, on a cylinder-by-cylinder basis, and an intake lift solenoid valve 44 (see FIG. 2) connected to the ECU 2. The low-speed rocker arms 43 and 43 are in contact with the respective intake valve 4 and 4 of each cylinder 3a.

In the intake lift switching mechanism 41, the intake lift solenoid valve 44 is controlled by an intake lift control input U_VTEC from the ECU 2, whereby the operation mode of the intake lift switching mechanism 41 is switched to a low-lift mode or a high-lift mode. In the low-lift mode, as the intake camshaft 5 rotates, the low-speed rocker arms 43 are driven by the associated low-speed cams, and the high-speed rocker arm is driven by the associated high-speed cam. In this case, however, the high-speed rocker arm pivotally moves about the rocker-arm shaft 42 separately from the intake valves 4. As a consequence, the intake valves 4 are opened and closed by the low-speed rocker arms 43 to a predetermined lift over a predetermined valve open time period.

On the other hand, in the high-lift mode, the high-speed locker arm is integrally connected to the low-speed rocker arms 43 and 43. As the intake camshaft 5 rotates, the high-speed rocker arm is driven by the high-speed cams, whereby as the high-speed rocker arm rotates, the low-speed rocker arms 43 rotate in unison with the high-speed rocker arm 5. As a consequence, in the high-lift mode, the intake valves 4 are opened and closed by the high-speed rocker arm via the low-speed rocker arms 43, whereby the intake valves 4 are opened to a higher lift over a longer valve open time period than in the low-lift mode. When the engine 3 is to be operated in a compression ignition combustion mode, described hereinafter, the operation mode of the intake lift switching mechanism 41 is set to the low-lift mode.

Figure 5:
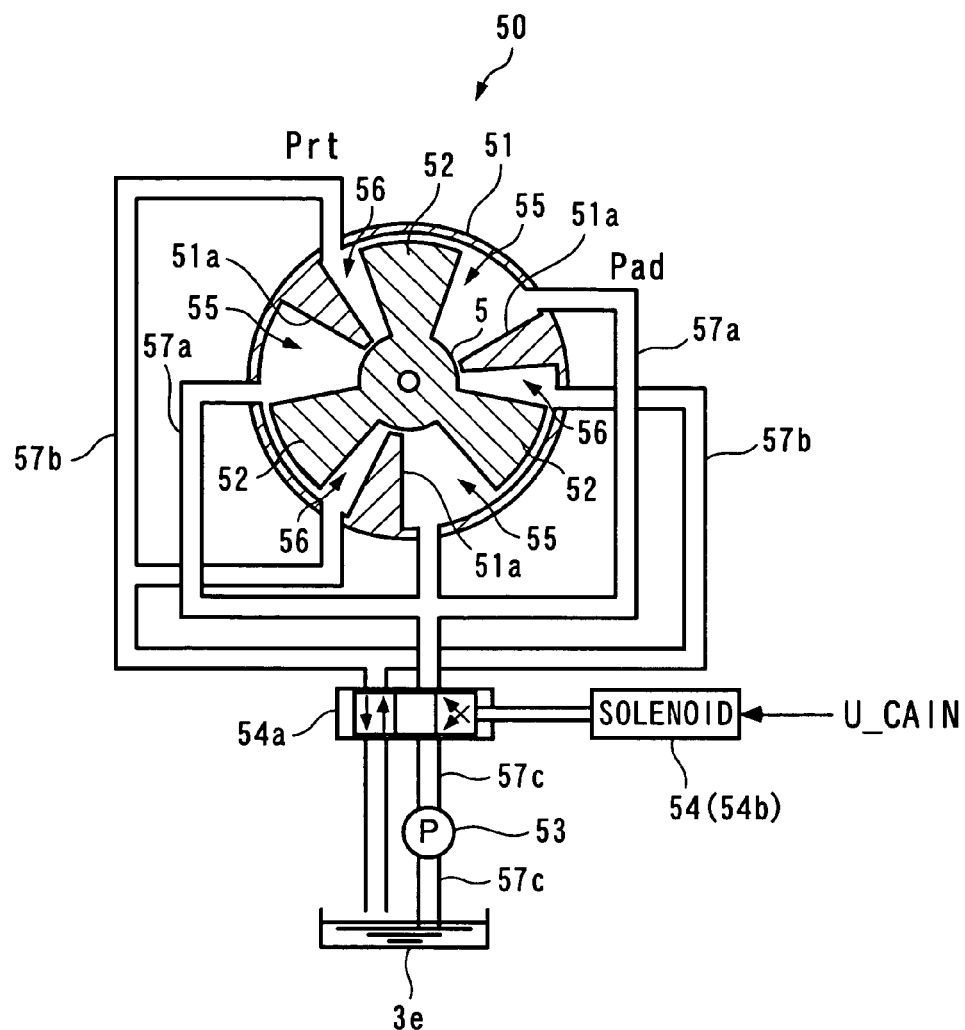
FIG. 5 is a schematic view of a variable intake cam phase mechanism.

Next, a description will be given of the variable intake cam phase mechanism 50. The variable intake cam phase mechanism 50 continuously advances or retards a relative phase CAIN of the intake camshaft 5 with respect to the crankshaft 3d (hereinafter referred to as "the intake cam phase CAIN"), and is provided at the one end of the intake camshaft 5 where the intake sprocket is mounted. As shown in FIG. 5, the variable intake cam phase mechanism 50 includes a housing 51, a three-bladed vane 52, an oil pressure pump 53, and an intake cam phase solenoid valve 54.

The housing 51 is integrally formed with the intake sprocket on the intake camshaft 5, and is divided by three partition walls 51a formed at equal intervals. The vane 52 is coaxially mounted on the end of the intake camshaft 5 where the intake sprocket is mounted, such that the blades of the vane 52 radially extend outward from the intake camshaft 5, and are rotatably housed in the housing 51. Further, the housing 51 has three advance chambers 55 and three retard chambers 56 each formed between one of the partition walls 51a and one of the three blades of the vane 52.

The oil pressure pump 53 is a mechanical one connected to the crankshaft 3d. As the crankshaft 3d rotates, the oil pressure pump 53 draws lubricating oil stored in an oil pan 3e of the engine 3 via a lower part of an oil passage 57c, for pressurization, and supplies the pressurized oil to the intake cam phase solenoid valve 54 via the remaining part of the oil passage 57c.

The intake cam phase solenoid valve 54 is formed by combining a spool valve mechanism 54a and a solenoid 54b, and is connected to the advance chambers 55 and retard chambers 56 via an advance oil passage 57a and a retard oil passage 57b such that oil pressure Poil supplied from the oil pressure pump 53 is delivered to the advance chambers 55 and the retard chambers 56 as advance oil pressure Pad and retard oil pressure Prt. The solenoid 54b of the intake cam phase solenoid valve 54 is electrically connected to the ECU 2, and is responsive to an intake phase control input U_CAIN, referred to hereinafter, from the ECU 2, for moving a spool valve element of the spool valve mechanism 54*a* within a predetermined range of motion to thereby change both the advance oil pressure Pad and the retard oil pressure Prt.

Figure 6:
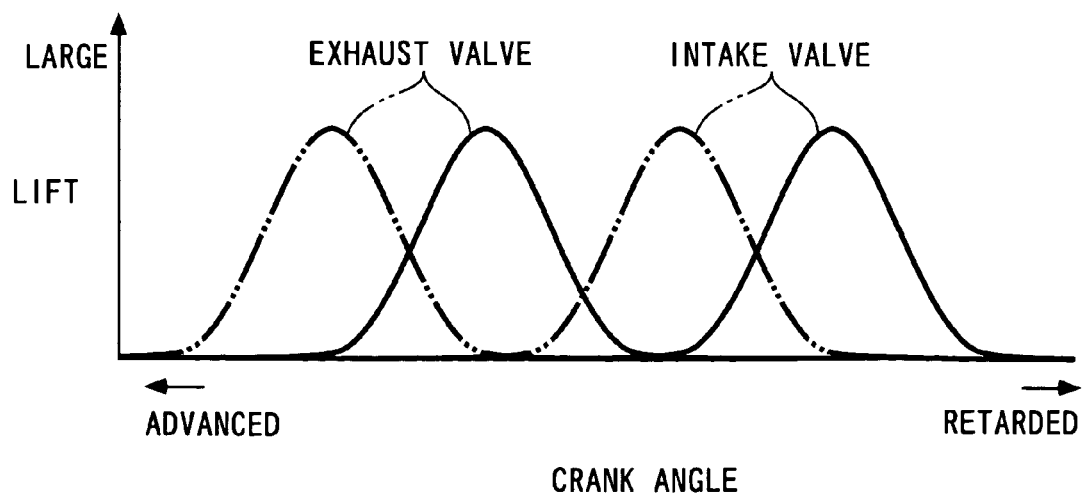
FIG. 6 is a diagram of valve lift curves of an intake valve depicted in respective cases where the variable intake cam phase mechanism sets an intake cam phase to a most retarded value (solid line) and a most advanced value (two dot-chain line), and valve lift curves of an exhaust valve depicted in respective cases where a variable exhaust cam phase mechanism sets an exhaust cam phase to a most retarded value (solid line) and a most advanced value (two dot-chain line)

In the variable intake cam phase mechanism 50 configured as above, during operation of the oil pressure pump 53, the intake cam phase solenoid valve 54 is operated according to the intake phase control input U_CAIN, to supply the advance oil pressure Pad to the advance chambers 55 and the retard oil pressure Prt to the retard chambers 56, whereby the relative phase of the vane 52 with respect to the housing 51 is changed toward an advanced side or a retarded side. As a result, the aforementioned intake cam phase CAIN is continuously changed between a predetermined most retarded value and a predetermined most advanced value, whereby the valve timing of the intake valves 4 is continuously changed between most retarded timing indicated by a solid line in FIG. 6 and most advanced timing indicated by a two-dot chain line in FIG. 6.

It should be noted that the variable intake cam phase mechanism 50 includes a lock mechanism, not shown, which holds the intake cam phase CAIN at a value corresponding to the intake phase control input U_CAIN. Further, when oil pressure supplied from the oil pressure pump 53 is low, when the intake phase control input U_CAIN is set to a value of 0 as described hereinafter, or when the intake phase control input U_CAIN is not input to the intake cam phase solenoid valve 54 due to a disconnection or the like, the lock mechanism inhibits the variable intake cam phase mechanism 50 from changing the intake cam phase CAIN, whereby the intake cam phase CAIN is locked to a predetermined value for a failure time.

An intake cam angle sensor 27 (see FIG. 2) is disposed at the other end of the intake camshaft 5, opposite to the end where the variable intake cam phase mechanism 50 is disposed. The intake cam angle sensor 27 is implemented e.g. by a magnet rotor and an MRE pickup (neither of which is shown), and delivers an INCAM signal, which is a pulse signal, to the ECU 2 along with rotation of the intake camshaft 5. Each pulse of the INCAM signal is generated whenever the intake camshaft 5 rotates through a predetermined cam angle (e.g. 1°), and the ECU 2 calculates the intake cam phase CAIN based on the INCAM signal and the aforementioned CRK signal.

Figure 7:
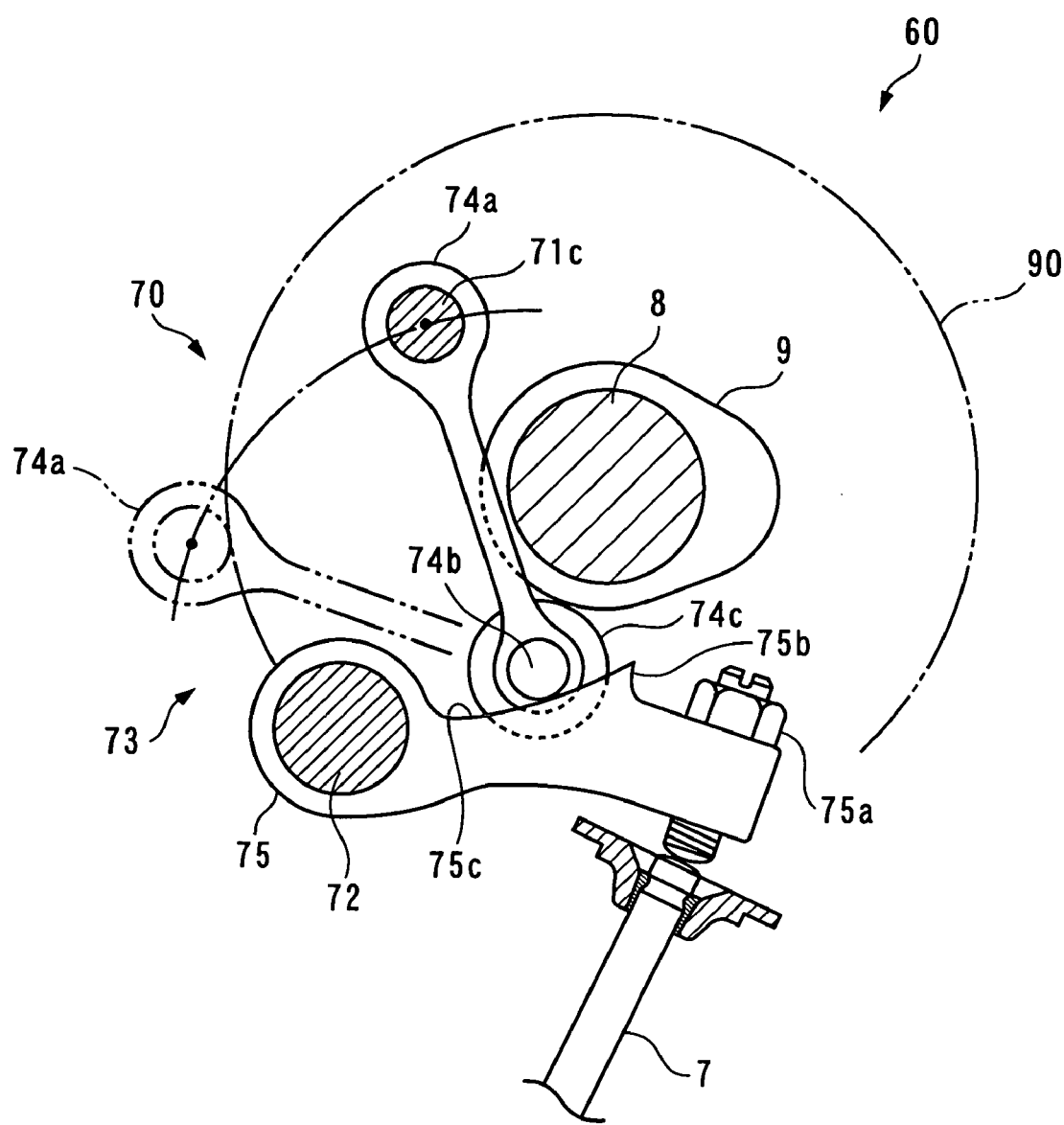
FIG. 7 is a schematic view of the exhaust-side valve actuating mechanism.

Next, a description will be given of the exhaust-side valve actuating mechanism 60. As shown in FIG. 7, the exhaust-side valve actuating mechanism 60 includes the exhaust camshaft 8, the exhaust cam 9, a variable exhaust lift mechanism 70, and the variable exhaust cam phase mechanism 90.

Figure 8:
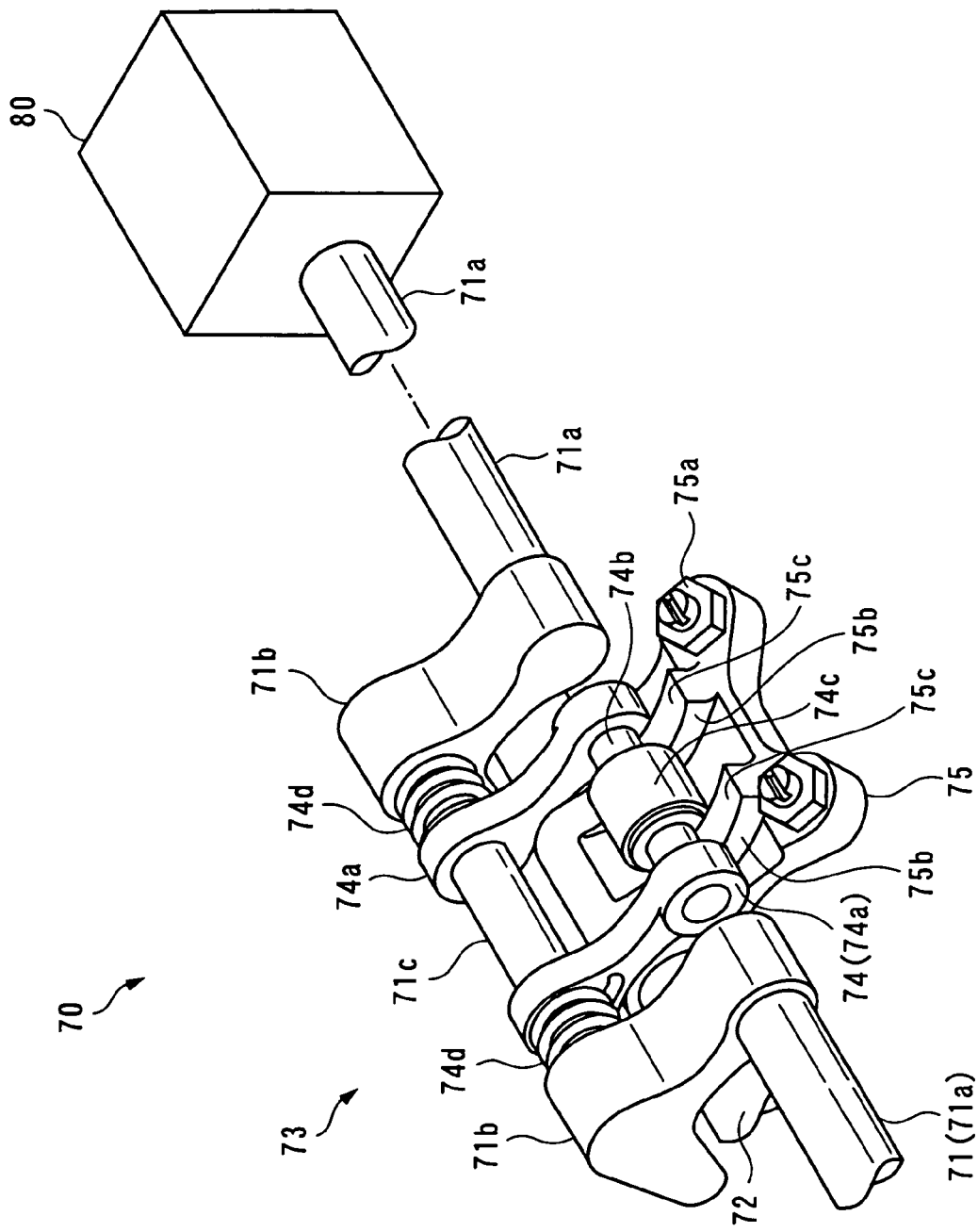
FIG. 8 is a fragmentary perspective view of a variable exhaust lift mechanism.
Figure 10:
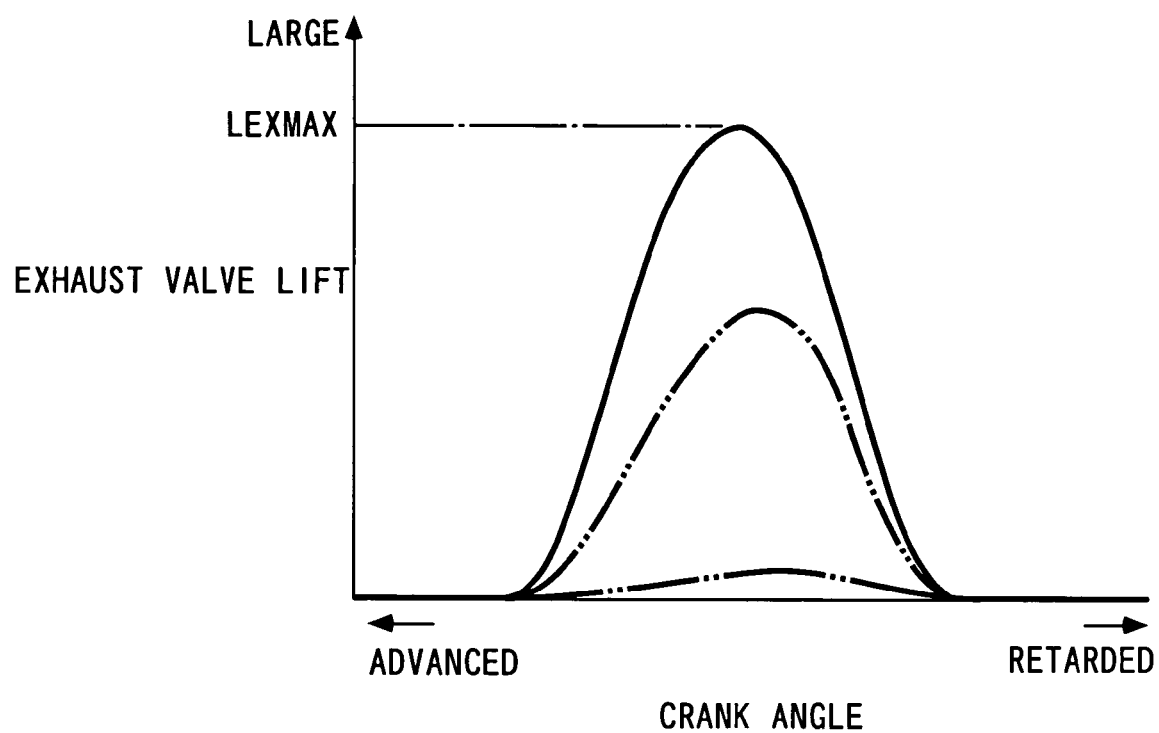
FIG. 10 is a view illustrating changes in exhaust lift by the variable exhaust lift mechanism.

The variable exhaust lift mechanism 70 opens and closes the exhaust valves 7 by rotation of the exhaust camshaft 8 caused by rotation of the crankshaft 3*d* to thereby continuously change exhaust lift between a value of 0 and a predetermined maximum value LEXMAX (see FIG. 10). As shown in FIGS. 8 and 9, the variable exhaust lift mechanism 70 is comprised of a control shaft 71 and a rocker arm shaft 72, rocker arm mechanisms 73 provided on the shafts 71 and 72 on a cylinder-by-cylinder basis, and an exhaust lift actuator 80 for driving the rocker arm mechanisms 73 simultaneously.

The control shaft 71 is comprised of pivot parts 71*a*, holder parts 71*b*, and eccentric shaft parts 71*c*, which are assembled into a unit. The control shaft 71 extends along the exhaust camshaft 8, with the pivot parts 71*a* rotatably attached to the cylinder heads 3*c*, and one pivot part 71*a* at one end of the unit connected to the exhaust lift actuator 80.

Each of the rocker arm mechanisms 73 is implemented by a combination of upper and lower rocker arms 74 and 75. The upper rocker arm 74 is comprised of a pair of links 74*a* and 74*a*, a roller shaft 74*b*, a roller 74*c*, and a pair of coil springs 74*d* and 74*d*. The roller shaft 74*b* has opposite ends thereof fitted in one ends of the respective links 74*a* and 74*a*, respectively, and is rotatably supported by the links 74*a* and 74*a*. The roller 74*c* is rotatably fitted on the roller shaft 74*b*.

The other ends of the respective links 74*a* are pivotally fitted on the eccentric shaft part 71*c* of the control shaft 71, and are each connected to an associated one of the holder parts 71*b* via an associated one of the coil springs 74*d*. The roller 74*c* is brought into contact with the cam surface of the exhaust cam 9 by the urging forces of the respective coil springs 74*d* acting on the links 74*a*, respectively. Further, when the roller 74*c* is in contact with the circular base part of the cam surface of the exhaust cam 9, the roller shaft 74*b* is held in its original position (i.e. the position shown in FIG. 7) where the axis of the roller shaft 74*b* is aligned with the axis of the pivot part 71*a*.

The lower rocker arm 75 is configured such that one end thereof is pivotally supported by the rocker arm shaft 72, and the other end thereof has adjusting bolts 75*a* and 75*a* inserted therethrough, and are in contact with the respective upper ends of the exhaust valves 7 via the adjusting bolts 75*a* and 75*a*.

Further, the lower rocker arm 75 has a pair of guide parts 75*b* and 75*b* projecting upward. Each of the guide parts 75*b* has an upper surface thereof formed as a guide surface 75*c* for guiding the roller shaft 74*b* of the upper rocker arm 74, and is held in contact with the roller shaft 74*b* via the guide surface 75*c* by the urging force of the associated one of the valve springs 7*e*. The guide surface 75*c* has an arcuate shape which protrudes downward and coincides with an arc drawn about the axis of, i.e. is concentric with, the eccentric shaft part 71*c* when the links 74*a* are in the valve-closing position indicated by solid lines in FIG. 7. In the state where the guide parts 75*b* are in contact with the roller shaft 74*b*, the roller 74*c* is positioned between the guide parts 75*b* and 75*b*, and is held in contact only with the exhaust cam 9 without being brought into contact with the lower rocker arm 75.

The exhaust lift actuator 80 is implemented by a combination of a motor, not shown, and a reduction gear mechanism, not shown, and is electrically connected to the ECU 2. When driven by the ECU 2, the exhaust lift actuator 80 causes the control shaft 71 to pivotally move about the axis of the pivot parts 71*a*. As the control shaft 71 pivotally moves, the links 74*a* pivotally move about the roller shaft 74*b*.

Next, a description will be given of the operation of the variable exhaust lift mechanism 70 configured as above. In the variable exhaust lift mechanism 70, when the exhaust lift actuator 80 is driven by an exhaust lift control input U_SAAEX, described hereinafter, from the ECU 2, the control shaft 71 starts pivotal motion. When the control shaft 71 is thus pivotably moved, a turning angle SAAEX of the control shaft 71 is limited within a predetermined range by a stopper, not shown, whereby e.g. when the roller shaft 74*b* is in the aforementioned original position, the turning range of the links 74*a* is also limited between the zero lift position indicated by the solid line in FIG. 7 and a maximum lift position indicated by a two-dot chain line in FIG. 7.

When the links 74*a* are in the zero lift position, if the exhaust cam 9 rotates to push the roller 74*c* by the cam nose thereof toward the rocker arm shaft 72, the links 74*a* pivotally move clockwise, as viewed in FIG. 7, about the eccentric shaft part 71*c*. In this case, since the guide surfaces 75*c* of the lower rocker arm 75 each have the shape which coincides with the arc drawn about the axis of the eccentric shaft part 71*c*, as described hereinabove, the lower rocker arm 75 is held in the valve-closing position shown in FIG. 7 by the urging forces of the respective valve springs 7e. This holds the exhaust lift at a value of 0, whereby the exhaust valves 7 are held in the closed state.

On the other hand, when the links 74a have been pivotally moved from the zero lift position to a position toward the maximum lift position and held thereat, if the rotation of the exhaust cam 9 causes the links 74a to pivotally move clockwise, as viewed in FIG. 7, about the eccentric shaft part 71c, the lower rocker arm 75 pivotally moves downward from the valve-closing position in FIG. 7 against the urging forces of the respective valve springs 7e to open the exhaust valves 7. In this case, the amount of pivotal motion of the lower rocker arm 75, i.e. the exhaust lift, becomes larger as the links 74a are in a position closer to the maximum lift position.

For the above reason, the exhaust valves 7 open with a larger lift as the links 74a are in a position closer to the maximum lift position. More specifically, during rotation of the exhaust cam 9, when the links 74a are in the maximum lift position, the exhaust valves 7 open in accordance with a valve lift curve indicated by a solid line in FIG. 10, and the exhaust lift shows its maximum value LEXMAX. Therefore, the variable exhaust lift mechanism 70 is capable of pivotally moving the links 74a between the zero lift position and the maximum lift position by the exhaust lift actuator 80 to thereby continuously change the exhaust lift between a value of 0 and the predetermined maximum value LEXMAX.

It should be noted that the variable exhaust lift mechanism 70 includes a lock mechanism, not shown, which locks the turning angle of the control shaft 71, i.e. the exhaust lift, to a predetermined value for a failure time when the exhaust lift control input U_SAAEX is set to a value of 0 as described hereinafter or when the exhaust lift control input U_SAAEX is not input to the exhaust lift actuator 80 due to a disconnection or the like.

Further, the variable exhaust lift mechanism 70 is provided with a turning angle sensor 28 (see FIG. 2) which detects the turning angle SAAEX of the control shaft 71 and delivers a signal indicative of the sensed turning angle SAAEX to the ECU 2.

Next, a description will be given of the variable exhaust cam phase mechanism 90. The variable exhaust cam phase mechanism 90 continuously advances or retards a relative phase CAEX of the exhaust camshaft 8 with respect to the crankshaft 3d (hereinafter referred to as "the exhaust cam phase CAEX"). The variable exhaust cam phase mechanism 90 is provided at the one end of the exhaust camshaft 8 where the exhaust sprocket is mounted.

The variable exhaust cam phase mechanism 90 is configured similarly to the variable intake cam phase mechanism 50, described above, and hence detailed description thereof is omitted. The variable exhaust cam phase mechanism 90 includes an exhaust cam phase solenoid valve 91, and when the exhaust cam phase solenoid valve 91 is driven by an exhaust phase control input U_CAEX, described hereinafter, from the ECU 2, the variable exhaust cam phase mechanism 90 continuously changes the exhaust cam phase CAEX between a predetermined most retarded value and a predetermined most advanced value, whereby the valve timing of the exhaust valves 7 is continuously changed between the most retarded timing indicated by the solid line in FIG. 6 and the most advanced timing indicated by the two-dot chain line in FIG. 6.

It should be noted that the variable exhaust cam phase mechanism 90 includes a lock mechanism, not shown, which holds the exhaust cam phase CAEX at a value corresponding to the exhaust phase control input U_CAEX. Further, when the exhaust phase control input U_CAEX is set to a value of 0 as described hereinafter or when the exhaust phase control input U_CAEX is not input to the exhaust cam phase solenoid valve 91 due to a disconnection or the like, the lock mechanism inhibits the variable exhaust cam phase mechanism 90 from changing the exhaust cam phase CAEX, whereby the exhaust cam phase CAEX is locked to a predetermined value for a failure time.

An exhaust cam angle sensor 29 (see FIG. 2) is disposed at the other end of the exhaust camshaft 8, opposite to the end where the exhaust sprocket is mounted. The exhaust cam angle sensor 29 is implemented e.g. by a magnet rotor and an MRE pickup (neither of which is shown), and delivers an EXCAM signal, which is a pulse signal, to the ECU 2 along with rotation of the exhaust camshaft 8. Each pulse of the EXCAM signal is generated whenever the exhaust camshaft 8 rotates through a predetermined cam angle (e.g. 1°), and the ECU 2 calculates the exhaust cam phase CAEX based on the EXCAM signal and the aforementioned CRK signal.

As described above, in the engine 3, it is possible to continuously change the valve timing of the intake valves 4 by the variable intake cam phase mechanism 50, as well as to continuously change the lift and valve timing of the exhaust valves 7 by the variable exhaust lift mechanism 70 and the variable exhaust cam phase mechanism 90, whereby the amount of combustion gases remaining in the associated cylinder 3a (hereinafter referred to as "the internal EGR amount") can be changed, as desired, by the three variable mechanisms 50, 70 and 90. In the present embodiment, the three variable mechanisms 50, 70, and 90 correspond to the internal EGR device. In the following description, causing combustion gases to remain in a cylinder 3a by the three variable mechanisms 50, 70 and 90 is referred to as "internal EGR".

Further, in the present embodiment, an atmospheric pressure sensor 30, an accelerator pedal opening sensor 31, a throttle valve opening sensor 32, and an exhaust gas temperature sensor 33 are connected to the ECU 2. The atmospheric pressure sensor 30 is implemented by a semiconductor pressure sensor, and detects atmospheric pressure PA to deliver a signal indicative of the sensed atmospheric pressure PA to the ECU 2. The accelerator pedal opening sensor 31 detects accelerator pedal opening AP as the amount of depression of an accelerator pedal, not shown, and delivers a signal indicative of the sensed accelerator pedal opening AP to the ECU 2. In the present embodiment, the accelerator pedal opening AP corresponds to the first and second operating condition parameters.

Further, the throttle valve opening sensor 32 is implemented e.g. by a potentiometer. The throttle valve opening sensor 32 detects the degree of opening (hereinafter referred to as "the throttle valve opening") TH of the throttle valve 13b, and delivers a signal indicative of the sensed throttle valve opening TH to the ECU 2. Further, the exhaust gas temperature sensor 33 detects temperature of exhaust gasses flowing through the exhaust pipe 14 (hereinafter referred to as "the exhaust gas temperature") TEX, and delivers a signal indicative of the detected exhaust gas temperature to the ECU 2.

The ECU 2 is implemented by a microcomputer comprised of a CPU, a RAM, a ROM, and an I/O interface (none of which are shown). The ECU 2 determines operating conditions of the engine 3, based on the outputs from the aforementioned sensors 20 to 32, according to control programs and the like stored in the ROM, carries out failure determination of the exhaust gas recirculation mechanism 16 and the three variable mechanisms 50, 70 and 90, and executes the control processes.

More specifically, as described hereinafter, the ECU 2 executes a fuel injection control process, the EGR control process including the failure determination process, an ignition timing control process, and a variable mechanism control process based on the operating conditions of the engine 3, and when conditions for execution of compression ignition combustion, referred to hereinafter, are satisfied, the engine 3 is operated in a compression ignition combustion mode in which air-fuel mixture is burned by compression spontaneous ignition without effecting spark ignition, and when the conditions for execution of compression ignition combustion are not satisfied, the engine 3 is operated in a spark ignition combustion mode in which air-fuel mixture is burned by spark ignition.

It should be noted that in the present embodiment, the ECU 2 corresponds to EGR rate parameter-calculating means, target value-setting means, EGR control value-calculating means, control means, failure determination means, EGR ratio-setting means, learned value-calculating means, inhibition means, EGR control means, external EGR failure determination means, target air-fuel ratio-setting means, air-fuel ratio control means, target EGR rate parameter-setting means, and demanded output-setting means.

Figure 11:
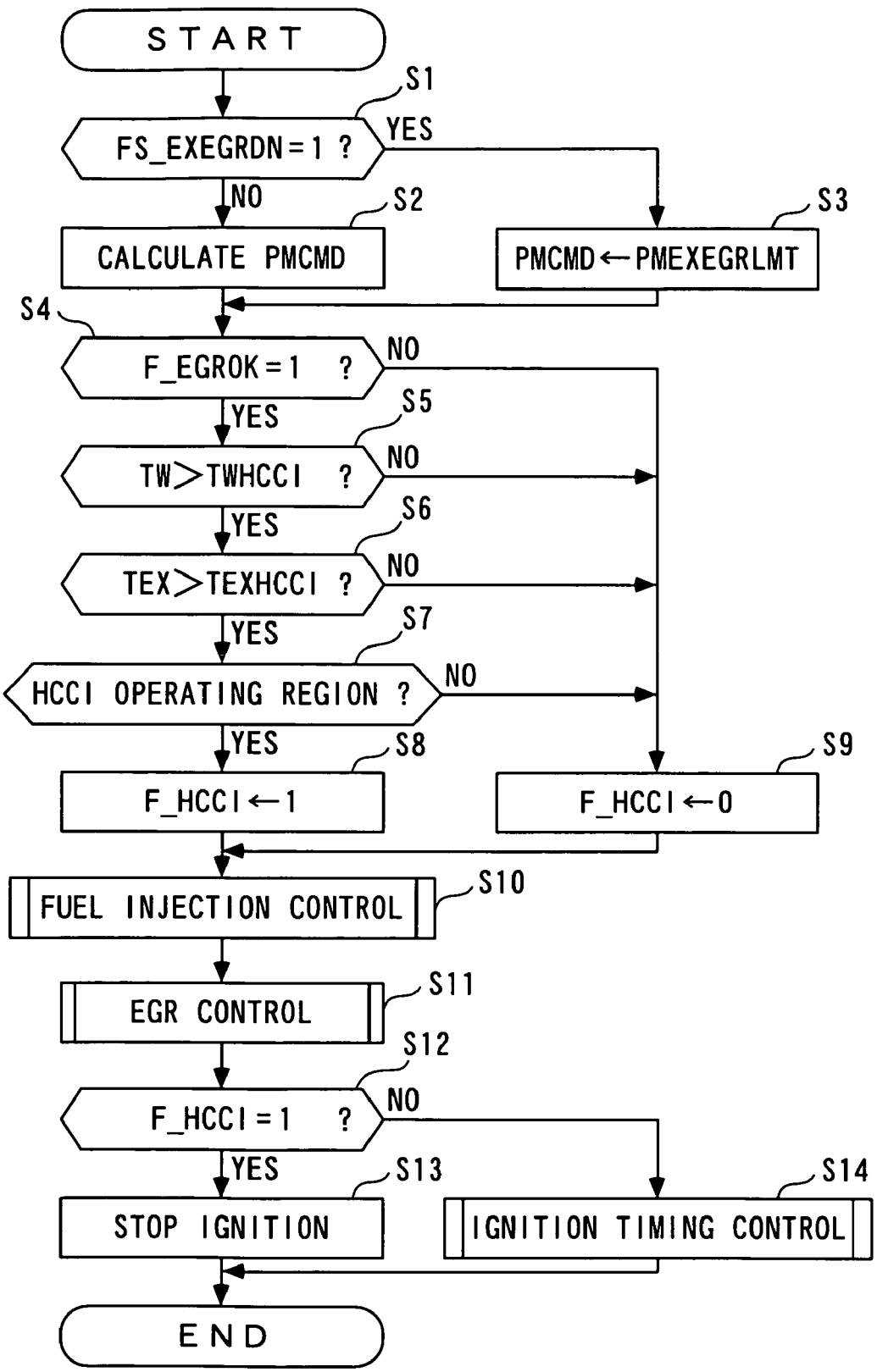
FIG. 11 is a flowchart showing a main flow of a control process executed with a control period synchronous with generation of each TDC signal pulse.

Hereafter, a control process executed by the ECU 2 in control timing synchronous with generation of each TDC signal pulse will be described with reference to FIG. 11. In the following description, calculated values are assumed to be stored in the RAM of the ECU 2. In this process, first, in a step 1 (shown as S1 in abbreviated form in FIG. 11; the following steps are also shown in abbreviated form), it is determined whether or not an external EGR too small flag FS_EX-EGRDN, referred to hereinafter, is equal to 1.

Figures 12, 13:
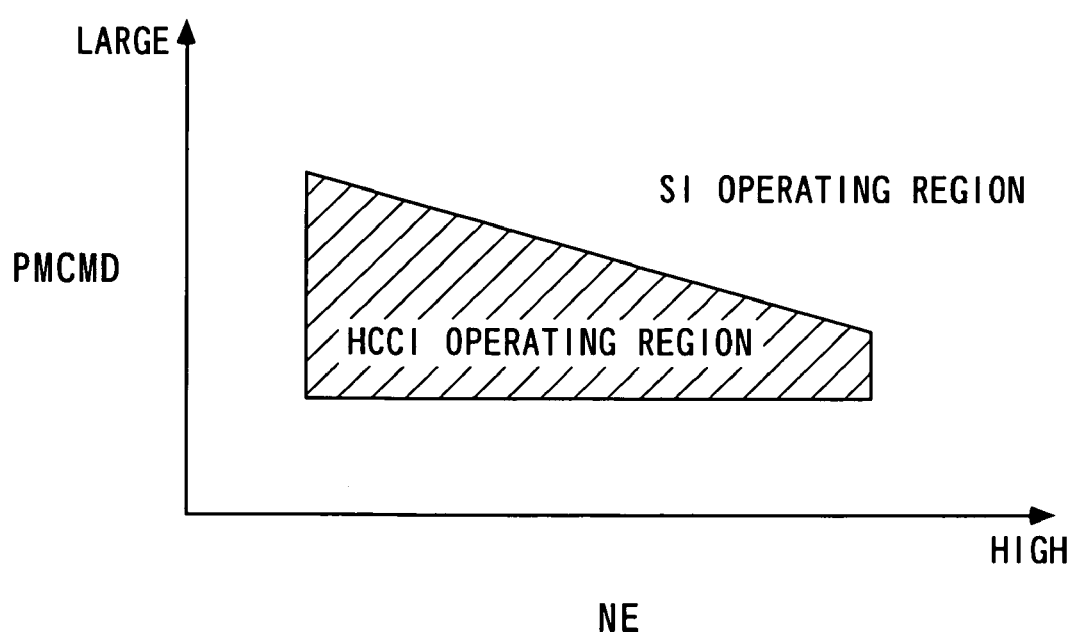
FIG. 12 is a view of an example of a map for use in calculation of a demanded torque PMCMD.
FIG. 13 is a view of an example of a map for use in determining an operating region of the engine.

If the answer to this question is negative (NO), the process proceeds to a step 2, wherein a demanded torque PMCMD is calculated by searching a map shown in FIG. 12 according to the engine speed NE and the accelerator pedal opening AP. Symbols i and j in FIG. 12 represent positive integers, respectively, and this also applies to the following description. In this map, the demanded torque PMCMD is configured as indicated mean effective pressure, and is set to a larger value as the engine speed NE is higher or as the accelerator pedal opening AP is larger. This is because as the engine speed NE is higher or the accelerator pedal opening AP is larger, the engine load is larger, and therefore a larger torque is demanded.

On the other hand, if the answer to the question of the step 1 is affirmative (YES), i.e. if the external EGR amount is too small due to the failure of the exhaust recirculation mechanism 16, the process proceeds to a step 3, wherein the demanded torque PMCMD is set to a predetermined limit value PMEXEGRLMT.

In a step 4 following the step 2 or 3, it is determined whether or not an EGR normal flag F_EGROK, described hereinafter, is equal to 1. If the answer to this question is affirmative (YES), i.e. if both the internal EGR and the external EGR are normally performed, the process proceeds to a step 5, wherein it is determined whether or not the engine coolant temperature TW is higher than a predetermined temperature TWHCCI.

If the answer to this question is affirmative (YES), i.e. if TW>TWHCCI holds, the process proceeds to a step 6, wherein it is determined whether or not an exhaust gas temperature TEX is higher than a predetermined temperature TEXHCCI. If the answer to this question is affirmative (YES), i.e. if TEX>TEXHCCI holds, the process proceeds to a step 7, wherein it is determined whether or not the engine is in an HCCI (Homogeneous Charge Compression Ignition) operating region (hatched area illustrated in FIG. 13) in which the engine 3 should perform compression ignition combustion, by searching a map shown in FIG. 13 according to the demanded torque PMCMD and the engine speed NE.

If the answer to this question is affirmative (YES), i.e. if the engine is in an HCCI operating region in which the engine 3 should perform compression ignition combustion, it is judged that executing conditions for performing a compression ignition combustion operation are satisfied, and to indicate the fact, a compression ignition combustion flag F_HCCI is set to 1 in a step 8.

On the other hand, if any of the answers to the questions of the steps 4 to 7 is negative (NO), it is judged that the executing conditions for performing the compression ignition combustion operation are satisfied, and to indicate the fact, the compression ignition combustion flag F_HCCI is set to 0 in a step 9.

In a step 10 following the step 8 or 9, the fuel injection control process is performed. The fuel injection control process is for calculating the amount TOUT of fuel to be injected to the cylinder 3a via the fuel injection valve 10 (hereinafter referred to as "the fuel injection amount TOUT"), injection timing, and so forth. Details of the fuel injection control process will be described hereinafter.

Then, in a step 11, the EGR control process is performed. The EGR control process is for calculating a target EGR lift LCMD for use in controlling the external EGR amount via the exhaust recirculation mechanism 16, and calculating a target pivot angle SAAEXCMD, a target exhaust cam phase CAEXCMD and a target intake cam phase CAINCMD for use in controlling the internal EGR amount via the three variable mechanisms 50, 70, and 90, respectively, as well as determining the failures of the four mechanisms 16, 50, 70, and 90. Details of the EGR control process will be described hereinafter.

Then, the process proceeds to a step 12, wherein it is determined whether or not the compression ignition combustion flag F_HCCI is equal to 1. If the answer to this question is affirmative (YES), i.e. if the executing conditions for performing the compression ignition combustion operation are satisfied, ignition using the spark plug 11 is stopped in a step 13, followed by terminating the present process. As a result, the engine 3 is operated in the compression ignition combustion mode.

On the other hand, if the answer to the question of the step 12 is negative (NO), i.e. if the executing conditions for performing the compression ignition combustion operation are not satisfied, and hence the engine 3 is in an operating condition in which a spark ignition combustion operation should be executed, the ignition timing control process is performed in a step 14, followed by terminating the present process. In the ignition timing control process, the ignition timing is calculated e.g. according to the load on the engine 3, although detailed description thereof is omitted here. Consequently, the mixture is ignited using the spark plug 11 in the calculated ignition timing, and the engine 3 is operated in the spark ignition combustion mode.

Figure 14:
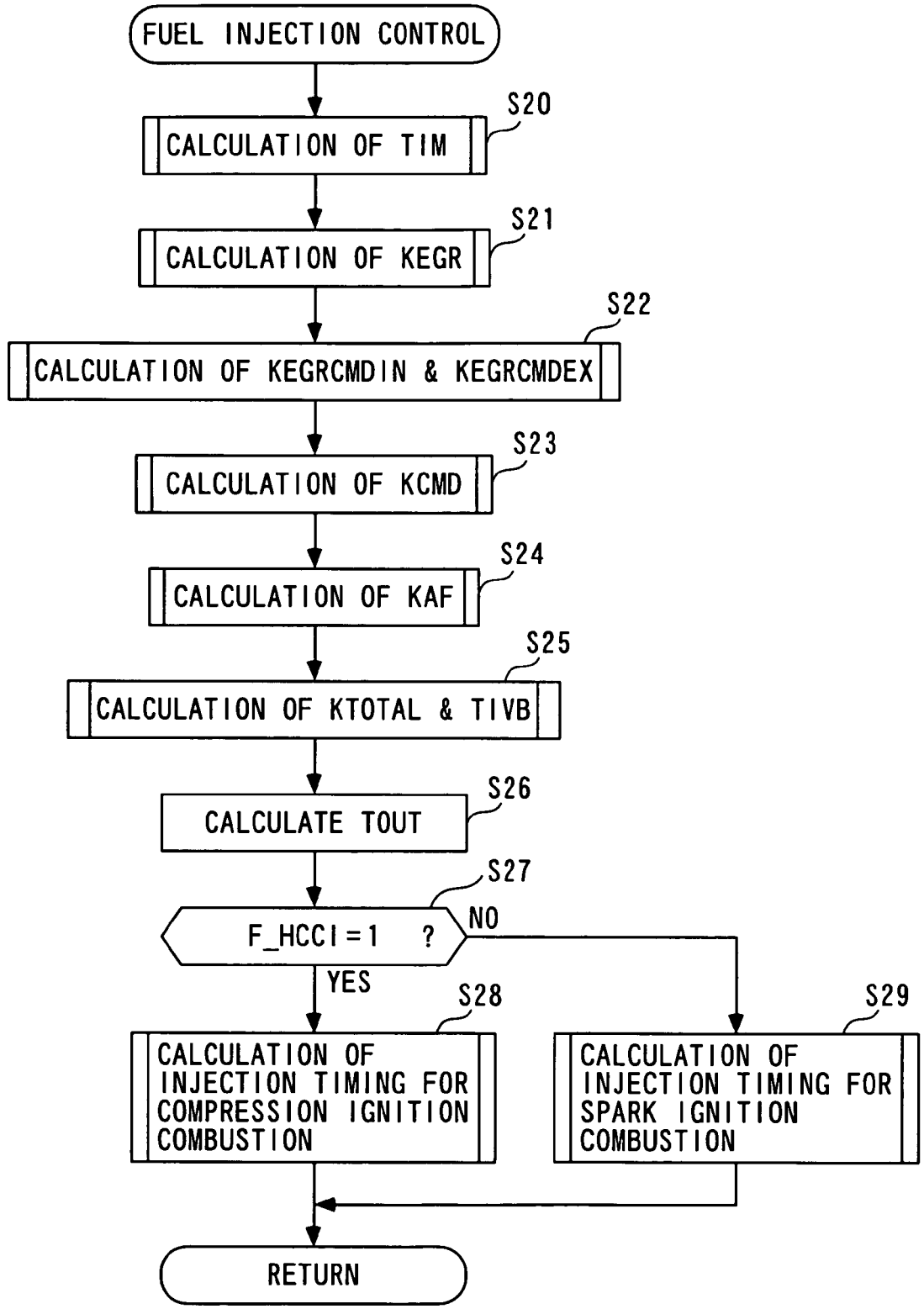
FIG. 14 is a flowchart of a fuel injection control process.
Figure 15:
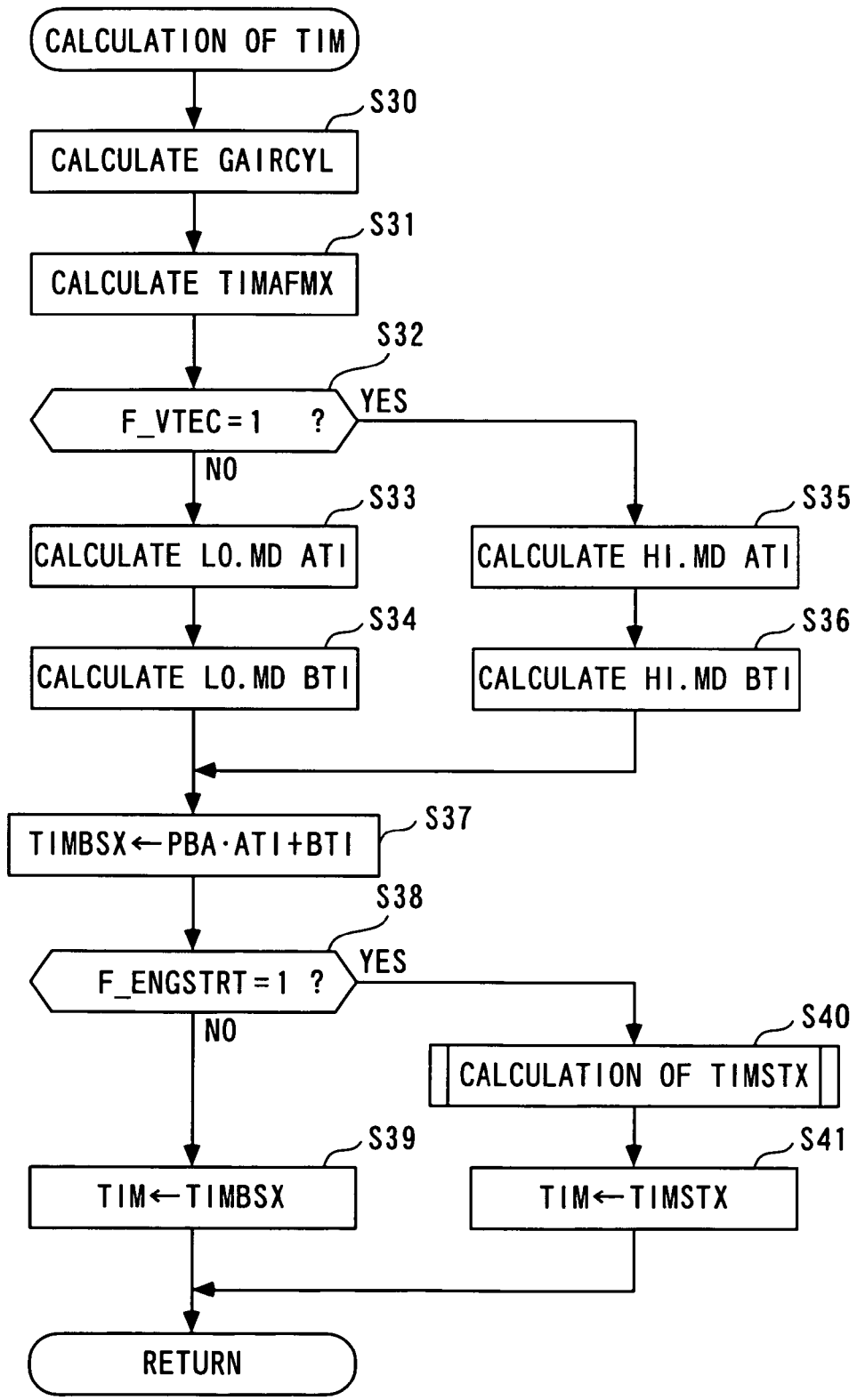
FIG. 15 is a flowchart of a process for calculating a basic fuel injection amount TIM.

Hereinafter, the aforementioned fuel injection control process will be described with reference to FIG. 14. In this process, first, in a step 20, a basic fuel injection amount TIM is calculated. More specifically, the basic fuel injection amount TIM is calculated as shown in FIG. 15.

First, in a step 30, a fresh intake air amount GAIRCYL is calculated. The fresh intake air amount GAIRCYL is the amount of fresh air estimated to have been drawn into the cylinder 3a, which is calculated based on the fresh air flow rate GIN detected by the air flow sensor 22, the engine speed NE, and so forth.

Figure 16:
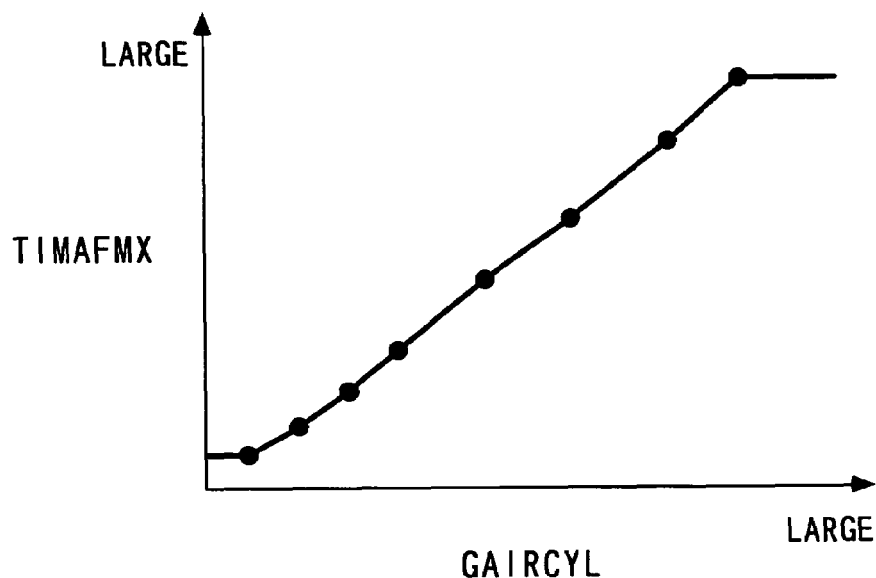
FIG. 16 is a view of an example of a map for use in calculation of a first basic fuel injection amount TIMAFMX.

Then, the process proceeds to a step 31, wherein a first basic fuel injection amount TIMAFMX is calculated by searching a map shown in FIG. 16 according to the fresh intake air amount GAIRCYL calculated in the step 30. In this map, the first basic fuel injection amount TIMAFMX is set to a larger value as the fresh intake air amount GAIRCYL is larger. This is because as the fresh intake air amount GAIRCYL is larger, a required engine 3 output is larger.

Then, the process proceeds to a step 32, wherein it is determined whether or not an intake lift flag F_VTEC is equal to 1. The intake lift flag F_VTEC is set to 1 when the engine 3 is in an operating region where the operation mode of the intake lift switching mechanism 41 should be set to the aforementioned high-lift mode, whereas when the engine 3 is in an operating region where the operation mode of the intake lift switching mechanism 41 should be set to the low-lift mode, the intake lift flag F_VTEC is set to 0. In the figures, the low-lift mode is represented by "LO. MD", and the high-lift mode by "HI. MD".

If the answer to the question of the step 32 is negative (NO), i.e. if the engine 3 is in the operating region where the operation mode of the intake lift switching mechanism 41 should be set to the low-lift mode, in other words, if the operation mode of the intake lift-switching mechanism 41 has been to the low lift mode, the calculation process proceeds to a step 33, wherein a low-lift mode fuel correction coefficient ATI is calculated by searching a map, not shown, according to the engine speed NE and the intake cam phase CAIN.

Then, in a step 34, a low-lift mode fuel correction term BTI is calculated by searching a map, not shown, according to the engine speed NE and the intake cam phase CAIN.

On the other hand, if the answer to the question of the step 32 is affirmative "YES", i.e. if the engine 3 is in the operating region where the operation mode of the intake lift switching mechanism 41 should be set to the high-lift mode, in other words, if the operating mode of the intake valve lift switching mechanism 41 is set to the high lift mode, the calculation process proceeds to a step 35, wherein a high-lift mode fuel correction coefficient ATI is calculated by searching a map, not shown, according to the engine speed NE and the intake cam phase CAIN.

Then, in a step 36, a high-lift mode fuel correction term BTI is calculated by searching a map, not shown, according to the engine speed NE and the intake cam phase CAIN.

In a step 37 following the step 34 or 36, the sum (PBA·ATI+ BTI) of the product of the intake pipe pressure and the fuel correction coefficient and the fuel correction term is set to a second basic fuel injection amount TIMBSX.

Then, the calculation process proceeds to a step 38, wherein it is determined whether or not an engine start flag F_ENGSTART is equal to 1. When engine start control is being executed, i.e. when the engine 3 is being cranked, the engine start flag F_ENGSTART is set to 1, and otherwise set to 0. If the answer to the question is negative (NO), i.e. if the engine has already been started, the calculation process proceeds to a step 39, wherein the basic fuel injection amount TIM is set to the second basic fuel injection amount TIMBSX, followed by terminating the present calculation process.

On the other hand, if the answer to the question of the step 38 is affirmative (YES), i.e. if the engine 3 is being cranked, the calculation process proceeds to a step 40, wherein a start-time basic fuel injection amount TIMSTX is calculated by searching a map, not shown, according to the engine coolant temperature TW. Then, in a step 41, the basic fuel injection amount TIM is set to the start-time basic fuel injection amount TIMSTX, followed by terminating the present calculation process.

Figure 17:
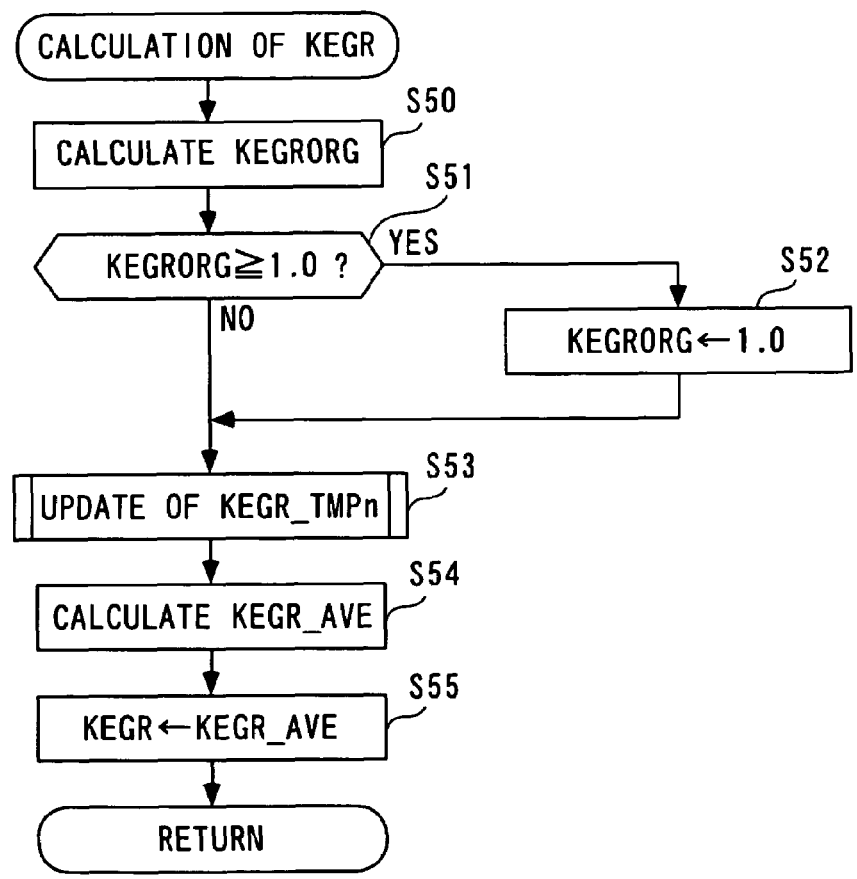
FIG. 17 is a flowchart of a process for calculating an actual fresh air ratio KEGR.

Referring again to FIG. 14, after the calculation of the basic fuel injection amount TIM in the step 20 is completed, the fuel injection control process proceeds to a step 21, wherein an actual fresh air ratio KEGR is calculated. The actual fresh air ratio KEGR corresponds to a ratio of fresh air amount drawn into the cylinder 3a to a total gas amount (fresh air amount+ internal EGR amount+external EGR amount), and a value (1.0−KEGR) obtained by subtracting the actual fresh air ratio KEGR from a value of 1.0 corresponds to a ratio of a total EGR amount (internal EGR amount+external EGR amount) to the total gas amount, i.e. an EGR rate. That is, the actual fresh air ratio KEGR represents the EGR rate as well, and hence in the present embodiment, it corresponds to an EGR rate parameter. More specifically, the actual fresh air ratio KEGR is calculated as shown in FIG. 17.

First, in a step 50, the current value KEGRORG of the actual fresh air ratio KEGR is calculated by the following equation (1):

$$KEGRORG = \frac{TIMAFMX}{TIMBSX \cdot KTA} \quad (1)$$

wherein KTA represents an intake temperature correction coefficient calculated by searching a map, not shown, according to the intake air temperature TA.

Then, the KEGR calculation process proceeds to a step 51, wherein it is determined whether or not the current value KEGRORG is not smaller than a value of 1.0. If the answer to the question is negative (NO), the calculation process proceeds to a step 53, referred to hereinafter. On the other hand, if the answer to the question is affirmative (YES), the current value KEGRORG is set to 1.0 in a step 52, followed by the process proceeding to the step 53.

In the step 53 following the step 51 or 52, m buffer values KEGR_TMPn (n=1 to m (positive integer)) of the KEGRORG value stored in the RAM are updated. More specifically, each of the buffer values in the RAM is set to the immediately preceding value which is a value preceding by one control cycle in the fuel injection control (for example, the current value KEGR_TMP1 of the buffer values is shifted to the immediately preceding value KEGR_TMP2, and the value KEGR_TMP2 is shifted to the second preceding value KEGR_TMP3, and so forth), and the current value KEGRORG calculated in the step 51 or 52 is set to the current value KEGR_TMP1 of the buffer values.

Then, the calculation process proceeds to a step 54, wherein a moving average value KEGR_AVE of the buffer values KEGR_TMPn is calculated by the following equation (2):

$$KEGR\_AVE = \frac{1}{m} \cdot \sum_{n=1}^{m} KEGR\_TMPn \quad (2)$$

Then, in a step 55, the actual fresh air ratio KEGR is set to the moving average value KEGR_AVE calculated in the step 54, followed by terminating the present calculation process.

Figure 18:
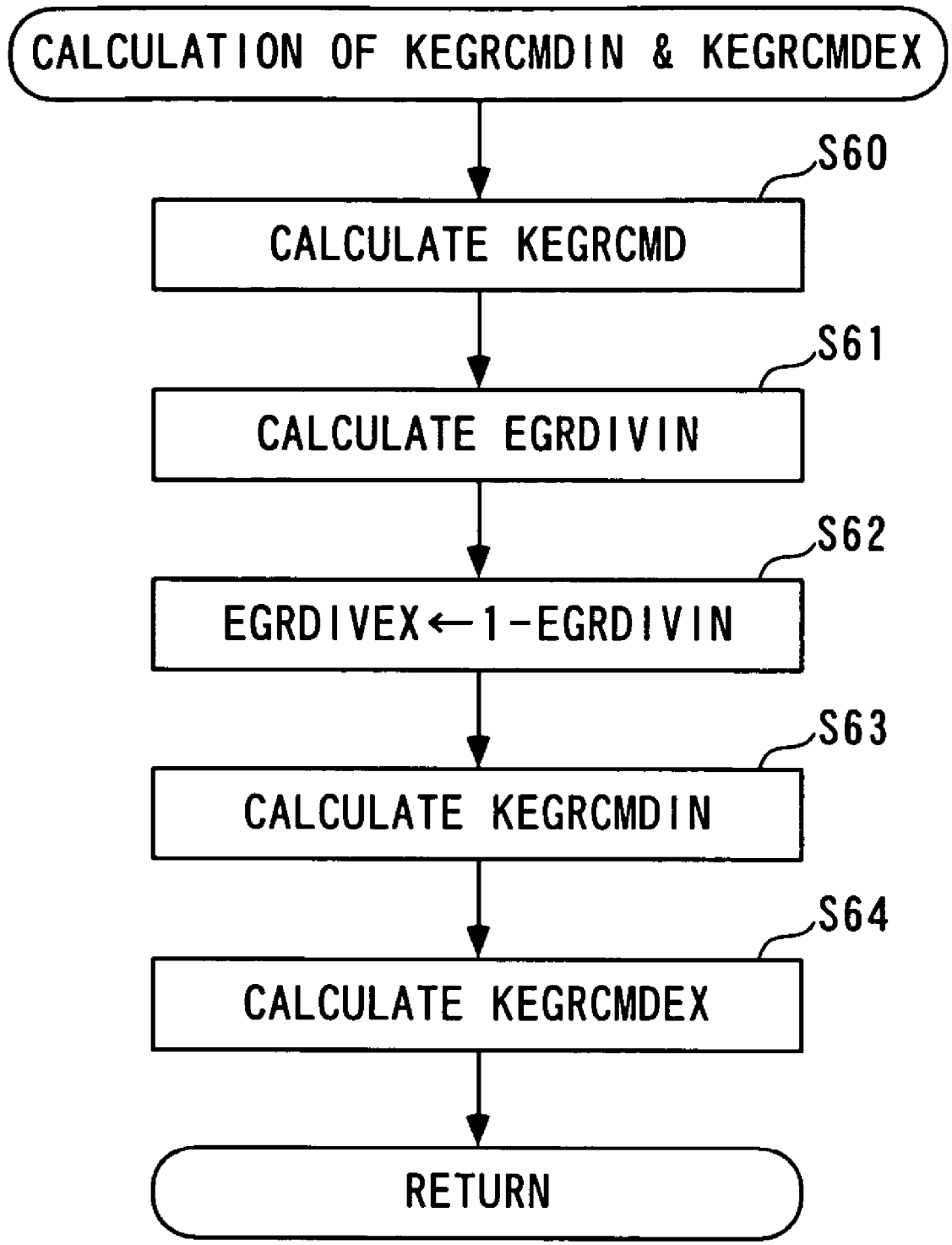
FIG. 18 is a flowchart of a process for calculating internal and external EGR target values KEGRCMDIN and KEGRCMDEX.

Referring again to FIG. 14, after calculating the actual fresh air ratio KEGR in the step 21, the fuel injection control process proceeds to a step 22, wherein an internal EGR target value KEGRCMDIN and an external EGR target value KEGRCMDEX are calculated. More specifically, the internal EGR target value KEGRCMDIN and the external EGR target value KEGRCMDEX are calculated as shown in FIG. 18.

First, in a step 60, a target value KEGRCMD of the actual fresh air ratio KEGR is calculated by searching a map shown in FIG. 19, according to the demanded torque PMCMD and the engine speed NE. In the present embodiment, the target value KEGRCMD is set such that $0 < \text{KEGRCMD} \leqq 1$ is satisfied, and corresponds to the target EGR rate parameter.

Then, the calculation process proceeds to a step 61, wherein an internal EGR ratio EGRDIVIN is calculated by searching a map shown in FIG. 20, according to the demanded torque PMCMD and the engine speed NE. Thereafter, in a step 62, an external EGR ratio EGRDIVEX is set to a value obtained by subtracting the internal EGR ratio EGRDIVIN from a value of 1.

Next, in a step 63, the internal EGR target value KEGRCMDIN is calculated based on the internal EGR ratio EGRDIVIN and the target value KEGRCMD by the following equation (3):

$$KEGRCMDIN = 1 - (1 - KEGRCMD) \cdot EGRDIVIN \quad (3)$$

The internal EGR target value KEGRCMDIN corresponds to a value obtained by subtracting a target value of the ratio of the internal EGR amount to the total EGR amount from a value of 1. In other words, the internal EGR target value KEGRCMDIN corresponds to a target value of the ratio of fresh air to be drawn into the cylinder through control of the internal EGR amount, assuming that the external EGR amount is controlled to 0.

Then, in a step 64, the external EGR target value KEGRCMDEX is calculated based on the external EGR ratio EGRDIVEX and the target value KEGRCMD by the following equation (4), followed by terminating the present calculation process:

$$KEGRCMDEX = 1 - (1 - KEGRCMD) \cdot EGRDIVEX \quad (4)$$

The external EGR target value KEGRCMDEX corresponds to a value obtained by subtracting a target value of the ratio of the external EGR amount to the total EGR amount from a value of 1. In other words, the external EGR target value KEGRCMDEX corresponds to a target value of the ratio of fresh air to be drawn into the cylinder 3a through control of the external EGR amount, assuming that the internal EGR amount is controlled to 0.

Referring again to FIG. 14, after calculating the two target values KEGRCMDIN and KEGRCMDEX in the step 22, the fuel injection control process proceeds to a step 23, wherein a target air-fuel ratio KCMD is calculated. More specifically, the target air-fuel ratio KCMD is calculated as shown in FIG. 21.

Figures 21, 22:
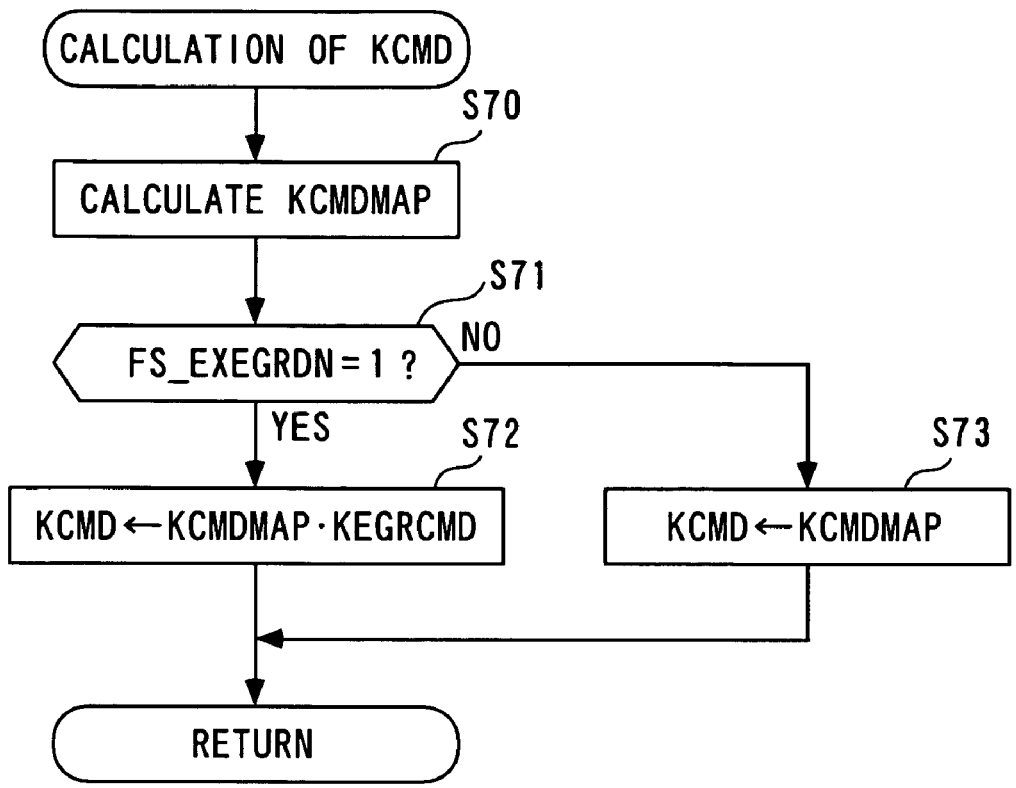
FIG. 21 is a flowchart of a process for calculating a target air fuel ratio KCMD.
FIG. 22 is a view of an example of a map for use in calculation of a target air-fuel ratio map value KCMDMAP.

First, in a step 70, a map value KCMDMAP of the target air-fuel ratio KCMD is calculated by searching a map shown in FIG. 22, according to the demanded torque PMCMD and the engine speed NE.

Then, the calculation process proceeds to a step 71, wherein it is determined whether or not a too small external EGR failure flag FS_EXEGRDN is equal to 1. If the answer to the question is affirmative (YES), i.e. if the external EGR amount is too small due to a failure of the EGR control valve 16b, the target air-fuel ratio KCMD is set to the product KCMDMAP·KEGRCMD of its map value and the target value of the actual fresh air ratio in a step 72, followed by terminating the present calculation process.

On the other hand, if the answer to the question of the step 71 is negative (NO), the calculation process proceeds to a step 73, wherein the target air-fuel ratio KCMD is set to the map value KCMDMAP, followed by terminating the present calculation process.

Referring again to FIG. 14, after calculating the target air-fuel ratio KCMD in the step 23, the fuel injection control process proceeds to a step 24, wherein an air-fuel ratio correction coefficient KAF is calculated. More specifically, the air-fuel ratio correction coefficient KAF is calculated as described below.

If conditions for executing air-fuel ratio feedback control are satisfied, the air-fuel ratio correction coefficient KAF is calculated with a predetermined feedback control algorithm (e.g. a PID control algorithm or a response-specifying control algorithm), not shown, such that the actual air-fuel ratio KACT is caused to converge to the target air-fuel ratio KCMD. On the other hand, if the conditions for executing air-fuel ratio feedback control are not satisfied, the air-fuel ratio correction coefficient KAF is set to a value of 1.

Then, the process proceeds to a step 25, wherein a total correction coefficient KTOTAL and a battery voltage correction term TIVB are calculated. The total correction coefficient KTOTAL is calculated by calculating various correction coefficients by searching respective associated maps according to operating parameters (e.g. the intake air temperature TA, the engine coolant temperature TW, the atmospheric pressure PA, etc.), and then multiplying the thus calculated correction coefficients by each other. The battery voltage correction term TIVB is calculated by searching a map, not shown, according to a battery voltage.

Then, in a step 26, the fuel injection amount TOUT is calculated based on the values calculated as above, by the following equation (5):

$$TOUT = TIM \cdot KEGR \cdot KCMD \cdot KAF \cdot KTOTAL + TIVB \quad (5)$$

In a step 27 following the step 26, it is determined whether or not the above-mentioned compression ignition combustion flag F_HCCI is equal to 1. If the answer to this question is affirmative (YES), i.e. if the executing conditions for performing the compression ignition combustion operation are satisfied, the process proceeds to a step 28, wherein an injection timing-calculating process for the compression ignition combustion is executed. Although not shown, in the step 28, timing for terminating fuel injection by the fuel injection valve 10 and a fuel injection time period over which the fuel injection valve 10 injects fuel are calculated based on the fuel injection amount TOUT calculated in the step 26, as optimum values for burning the mixture by compression ignition combustion. After the step 28 is executed as described above, the present process is terminated.

On the other hand, if the answer to the question of the step 27 is negative (NO), i.e. if the executing conditions for performing the compression ignition combustion operation are not satisfied, the process proceeds to a step 29, wherein an injection timing-calculating process for the spark ignition combustion is executed. Although not shown, in the step 29, the timing for terminating fuel injection by the fuel injection valve 10 and the fuel injection time period over which the fuel injection valve 10 injects fuel are calculated based on the fuel injection amount TOUT calculated in the step 26, as optimum values for burning the mixture by spark ignition combustion. After the step 29 is executed as described above, the present process is terminated.

Hereafter, the EGR control process will be described with reference to FIG. 23. In the present process, first, in a step 80, a process for calculating a feedback correction coefficient (hereinafter referred to as "the FB correction coefficient") KEGRFB is carried out. The FB correction coefficient KEGRFB converges the actual fresh air ratio KEGR to its target value KEGRCMD, as described in detail hereinafter.

Then, it is determined in a step 81 whether the aforementioned internal EGR ratio EGRDIVIN is not smaller than a value of 0.5. If the answer to the question is affirmative (YES), i.e. if the internal EGR amount is not smaller than the external EGR amount, the process proceeds to a step 82, wherein a value obtained by multiplying the internal EGR target value KEGRCMDIN obtained in the step 63 in FIG. 17 by the FB correction coefficient calculated in the step 80 is set to a corrected internal EGR rate KEGRMAPIN.

On the other hand, if the answer to the question of the step 81 is negative (NO), i.e. if the internal EGR amount is smaller than the external EGR amount, the process proceeds to a step 83, wherein a value obtained by multiplying the internal EGR target value KEGRCMDIN by the internal EGR-associated learned value KEGRREFIN of the FB correction coefficient is set to the corrected internal EGR rate KEGRMAPIN.

In a step 84 following the step 82 or 83, it is determined whether or not the intake lift flag F_VTEC is equal to 1. If the answer to the question is negative (NO), i.e. if the intake lift switching mechanism 41 has been set to the low-lift mode, the process proceeds to a step 85, wherein the target turning angle SAAEXCMD for the low-lift mode is calculated by searching a map shown in FIG. 24, according to the corrected internal EGR rate KEGRMAPIN calculated in the step 82 or 83 and the engine speed NE. The target turning angle SAAEXCMD is used as a target value of the turning angle SAAEX, as described hereinafter.

Next, the process proceeds to a step 86, wherein the low-lift mode target exhaust cam phase CAEXCMD is calculated by searching a map shown in FIG. 25, according to the corrected internal EGR rate KEGRMAPIN and the engine speed NE. The target exhaust cam phase CAEXCMD is used as a target value of the exhaust cam phase CAEX, as described hereinafter.

Then, in a step 87, the low-lift mode target intake cam phase CAINCMD is calculated by searching a map shown in FIG. 26, according to the corrected internal EGR rate KEGRMAPIN and the engine speed NE. The target intake cam phase CAINCMD is used as a target value of the intake cam phase CAIN, as described hereinafter.

On the other hand, if the answer to the question of the step 84 is affirmative (YES), i.e. if the intake lift switching mechanism 41 has been set to the high-lift mode, the target turning angle SAAEXCMD, the target exhaust cam phase CAEXCMD, and the target intake cam phase CAINCMD for the high-lift mode are calculated in steps 88 to 90, respectively, by searching respective associated predetermined maps, not shown, according to the demanded torque PMCMD and the engine speed NE.

In a step 91 following the step 87 or 90, it is determined whether or not the external EGR ratio EGRDIVEX is larger than a value of 0.5. If the answer to the question is affirmative (YES), i.e. if the external EGR amount is larger than the internal EGR amount, the process proceeds to a step 92, wherein a value obtained by multiplying the external EGR target value KEGRCMDEX by the FB correction coefficient KEGRFB is set to a corrected external EGR rate KEGRMAPEX.

On the other hand, if the answer to the question of the step 91 is negative (NO), i.e. if the external EGR amount is not larger than the internal EGR amount, the process proceeds to a step 93, wherein a value obtained by multiplying the internal EGR target value KEGRCMDEX by the external EGR-associated learned value KEGRREFEX of the FB correction coefficient is set to the corrected external EGR rate KEGRMAPEX.

Then, in a step 94, the target EGR lift LCMD is calculated by searching a map shown in FIG. 27, according to the corrected external EGR rate KEGRMAPEX calculated in the step 92 or 93 and an intake pipe gauge pressure HPBGA, followed by terminating the present process. The intake pipe gauge pressure HPBGA is calculated based on the intake pipe pressure PBA and the atmospheric pressure PA. The target EGR lift LCMD is used as a target value of the EGR lift LACT, as described hereinafter.

Figure 28:
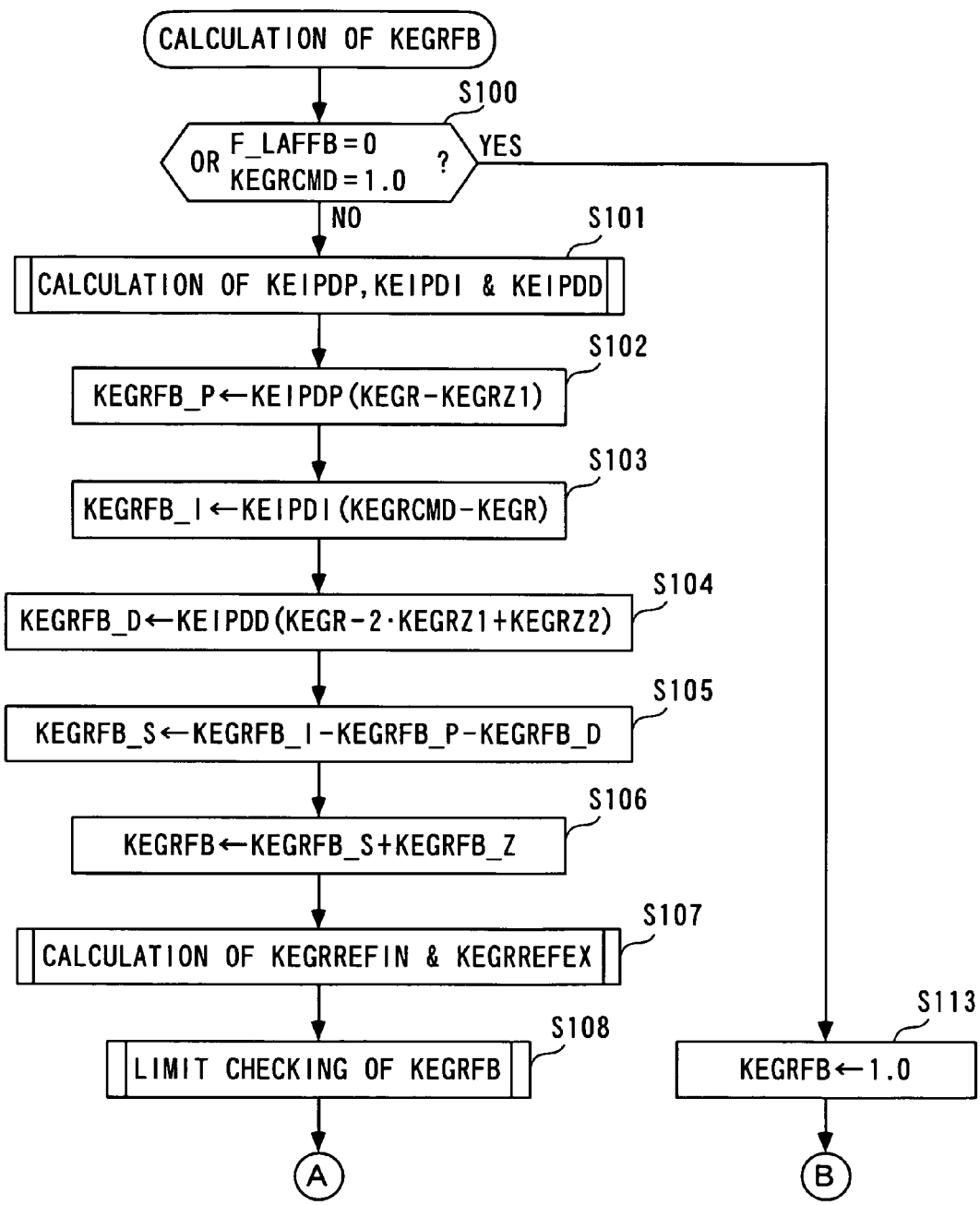
FIG. 28 is a flowchart of a process for calculating a feedback correction coefficient KEGRFB.
Figure 29:
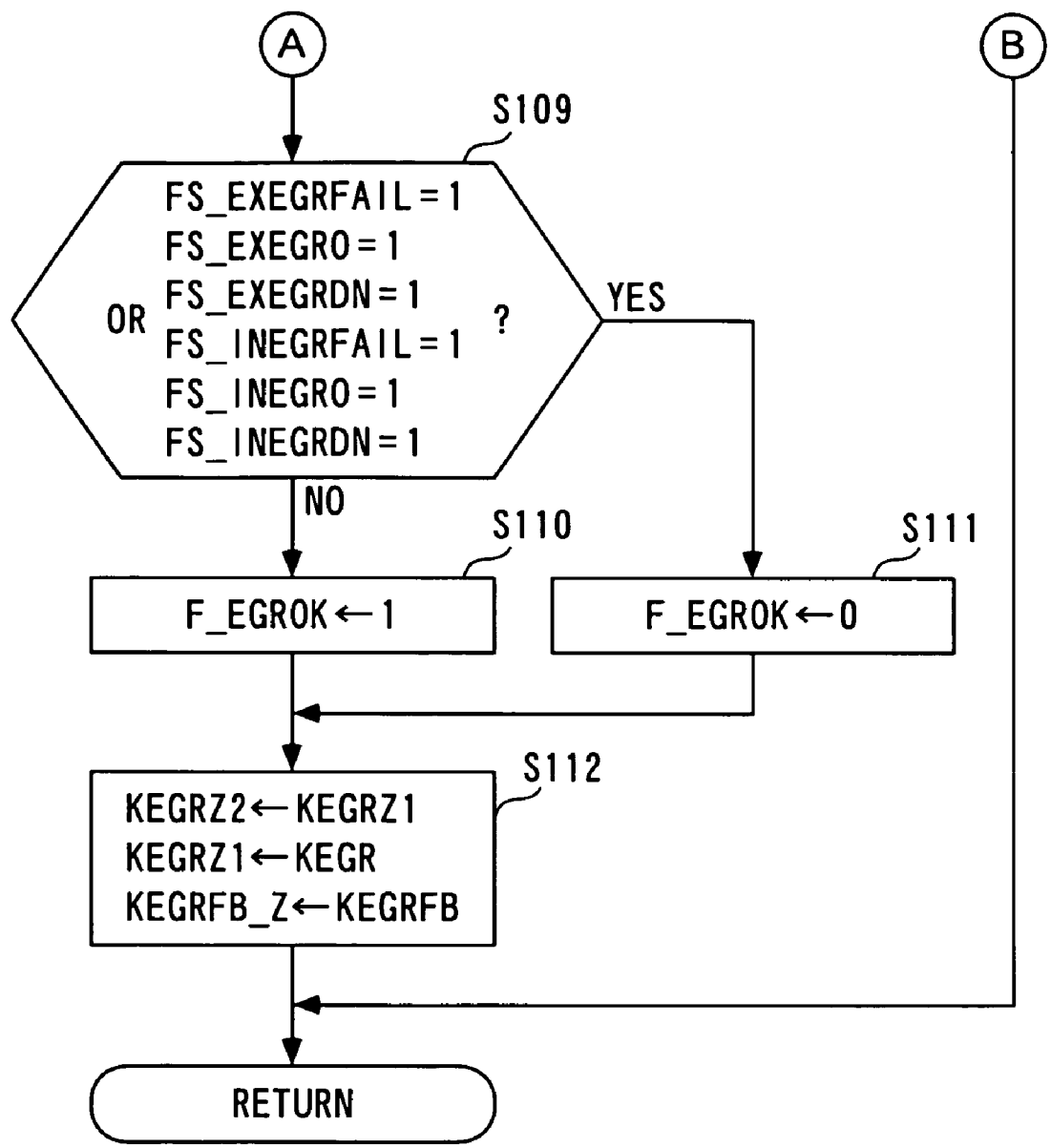
FIG. 29 is a flowchart of a continued part of FIG. 28.

Hereafter, the calculation process, referred to hereinbefore with reference to FIG. 23, for calculating the FB correction coefficient KEGRFB will be described with reference to FIGS. 28 and 29. In the step 80, not only the FB correction coefficient KEGRFB but also its internal EGR-associated learned value KEGRREFIN and its external EGR-associated learned value KEGRREFEX are calculated, as described in detail hereinafter. In the present embodiment, the FB correction coefficient KEGRFB corresponds to an EGR control value, and the internal EGR-associated learned value KEGRREFIN and the external EGR-associated learned value KEGRREFEX correspond to the learned values of EGR control values for internal EGR and external EGR, respectively.

In the present process, first, it is determined in a step 100 whether or not the condition of an air-fuel ratio feedback flag F_LAFFB being equal to 0 or the target value KEGRCMD of the actual fresh air ratio KEGR being equal to 1.0 is satisfied. If the answer to the question is affirmative (YES), i.e. if F_LAFFB=0 holds, which means that the air-fuel ratio feedback control based on the actual air-fuel ratio KACT detected by the LAF sensor 25 is not being executed, or if KEGRCMD=1.0 holds, which means that neither the internal EGR nor the external EGR is being performed, it is judged that the engine 3 is not in a region for carrying out feedback control of the actual fresh air ratio KEGR, so that the process proceeds to a step 113, wherein the FB correction coefficient KEGRFB is set to a value of 1.0, followed by terminating the present process.

On the other hand, if the answer to the question of the step 100 is negative (NO), i.e. if the air-fuel ratio feedback control is being carried out, and at least one of the internal EGR and the external EGR is being performed, the FB correction coefficient KEGRFB is calculated in the following steps 101 to 106, with an I-PD control algorithm.

First, in the step 101, a P-term gain KEIPDP, an I-term gain KEIPDI, and a D-term gain KEIPDD are calculated by searching respective associated maps, not shown, according to the engine speed NE and the demanded torque PMCMD.

Then, in the steps 102 to 104, a P term KEGRFB_P, an I term KEGRFB_I, and a D term KEGRFB_D are calculated by the following equations (6) to (8), using the P-term gain KEIPDP, the I-term gain KEIPDI, and the D-term gain KEIPDD calculated in the step 101, respectively:

$$KEGRFB\_P = KEIPDP(KEGR - KEGRZ1) \qquad (6)$$

$$KEGRFB\_I = KEIPDI(KEGRCMD - KEGR) \qquad (7)$$

$$KEGRFB\_D = KEIPDD(KEGR - 2 \cdot KEGRZ1 + KEGRZ2) \qquad (8)$$

It should be noted that KEGRZ1 in the equations (6) and (8) represents the immediately preceding value of the FB correction coefficient, and KEGRZ2 in the equation (8) represents the second preceding value of the FB correction coefficient.

Next, in a step 105, an I-PD term KEGRFB_S is calculated by the following equation (9), using the P term KEGRFB_P, the I term KEGRFB_I, and the D term KEGRFB_D calculated in the steps 102 to 104:

$$KEGRFB\_S = KEGRFB\_I - KEGRFB\_P - KEGRFB\_D \qquad (9)$$

Then, in the step 106, the FB correction coefficient KEGRFB is calculated by adding the immediately preceding value KEGRFB_Z of the FB correction coefficient to the I-PD term KEGRFB_S.

Thereafter, in a step 107, the internal EGR-associated learned value KEGRREFIN and the external EGR-associated learned value KEGRREFEX are calculated, and in a step 108, limit checking of the FB correction coefficient KEGRFB is executed. These processes will be described in detail hereinafter.

Then, the process proceeds to a step 109 in FIG. 29, wherein it is determined whether or not any of an external EGR failure flag FS_EXEGRFAIL, a too large external EGR failure flag FS_EXEGRO, the too small external EGR failure flag FS_EXEGRDN, an internal EGR failure flag FS_INEGRFAIL, a too large internal EGR failure flag FS_INEGRO, and a too small internal EGR failure flag FS_INEGRDN, which are set as described hereinafter in processing carried out in the step 107 or 108, is equal to 1.

If the answer to the question is negative (NO), i.e. if the six flags are all equal to 0, it is determined that both the internal EGR and the external EGR are being normally performed, so that an EGR normality flag F_EGROK is set to 1 in a step 110 so as to indicate the fact.

On the other hand, if the answer to the question of the step 109 is affirmative (YES), i.e. if at least one of the six flags is equal to 1, it is determined that the internal EGR and/or the external EGR are/is not being normally performed, so that the EGR normality flag F_EGROK is set to 0 in a step 111 so as to indicate the fact.

In a step 112 following the step 110 or 111, the immediately preceding value KEGRZ1 of the actual fresh air ratio is shifted to the second preceding value KEGRZ2, the actual fresh air ratio KEGR to the immediately preceding value KEGRZ1 thereof, and the FB correction coefficient KEGRFB to the immediately preceding value KEGRFB_Z thereof, followed by terminating the present process.

Figure 30:
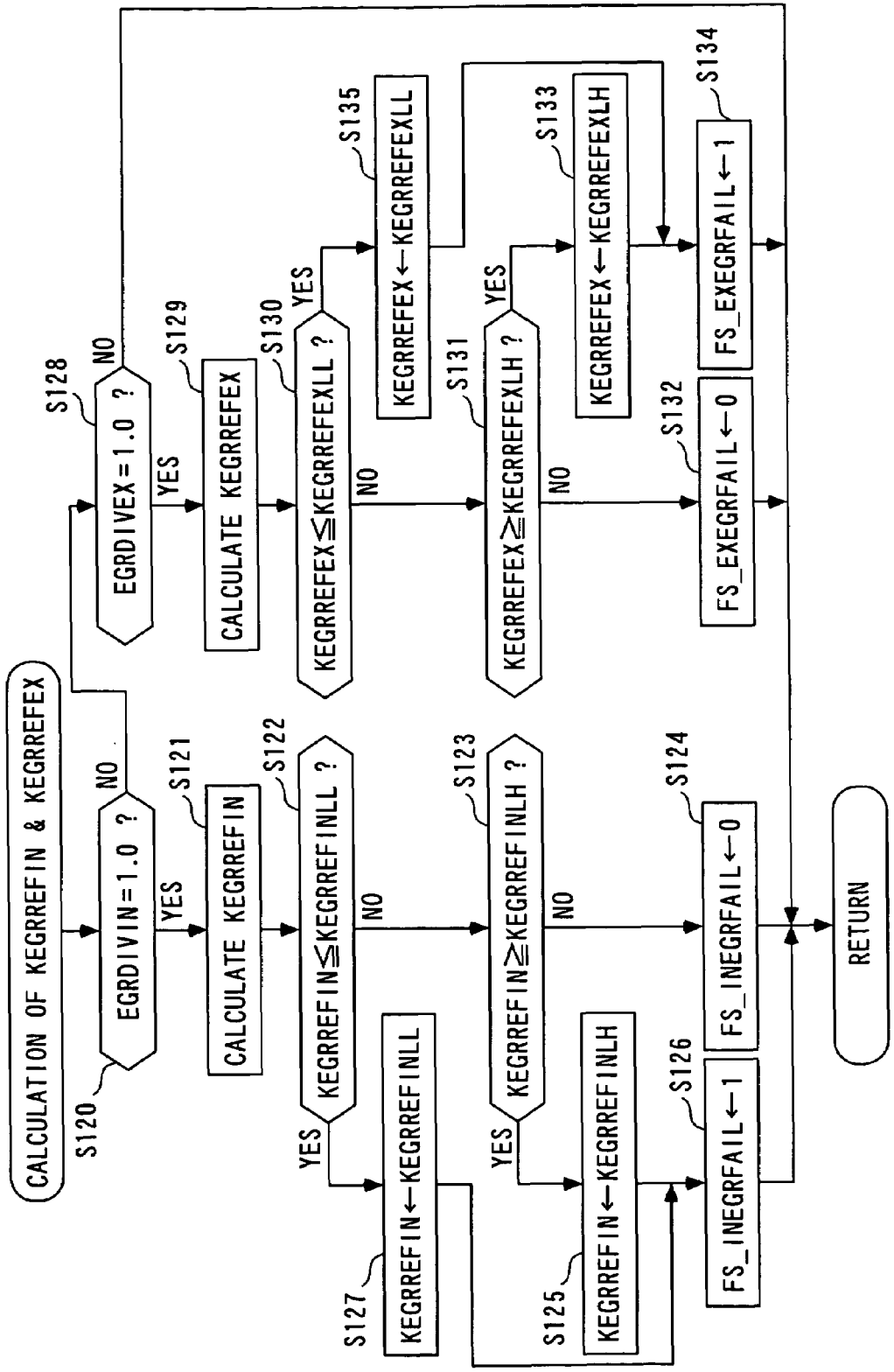
FIG. 30 is a flowchart of a process for calculating learned values KEGRREFIN and KEGRREFEX of internal and external EGR.

Hereafter, the calculation process carried out in the step 107 in FIG. 28, described hereinabove, for calculating the internal EGR-associated learned value KEGRREFIN of the FB correction coefficient KEGRFB and the external EGR-associated learned value KEGRREFEX of the same will be described with reference to FIG. 30.

In the present process, first, it is determined in a step 120 whether or not the internal EGR ratio EGRDIVIN is equal to a value of 1.0 (second predetermined value). If the answer to the question is affirmative (YES), i.e. if only the internal EGR is being performed, the process proceeds to a step 121, wherein the internal EGR-associated learned value KEGRREFIN is calculated by weighted averaging expressed by the following equation (10):

$$KEGRREFIN = CREFEGRIN \cdot KEGRFB + (1 - CREFEGRIN) \cdot KEGRREFINZ \qquad (10)$$

wherein KEGRREFINZ represents the immediately preceding value of the internal EGR-associated learned value KEGRREFIN, and CREFEGRIN a predetermined weighting coefficient set between a value of 0 and a value of 1.0.

Then, in the following steps 122 to 127, limit checking of the internal EGR-associated learned value KEGRREFIN calculated in the step 121 is carried out. First, in the step 122, it is determined whether the internal EGR-associated learned value KEGRREFIN is not larger than a predetermined lower limit value KEGRREFINLL. If the answer to the question is negative (NO), the process proceeds to the step 123, wherein it is determined whether the internal EGR-associated learned value KEGRREFIN is not smaller than a predetermined upper limit value KEGRREFINLH.

If the answer to the question is negative (NO), i.e. if KEGRREFINLL<KEGRREFIN<KEGRREFINLH holds, it is determined that the internal EGR is being normally performed, and the internal EGR failure flag FS_INEGRFAIL is set to 0 in the step 124, followed by terminating the present process.

On the other hand, if the answer to the question of the step 123 is affirmative (YES), i.e. if KEGRREFIN≧KEGRREFINLH holds, the internal EGR-associated learned value KEGRREFIN is set to the upper limit value KEGRREFINLH in the step 125.

Then, it is determined that the internal EGR is not being normally performed, so that in a step 126, the internal EGR failure flag FS_INEGRFAIL is set to 1 so as to indicate the fact, followed by terminating the present process.

On the other hand, if the answer to the question of the step 122 is affirmative (YES), i.e. if KEGRREFIN≧KEGRREFINLL holds, the internal EGR-associated learned value KEGRREFIN is set to the lower limit value KEGRREFINLL in the step 127.

Then, it is determined that the internal EGR is not being normally performed, so that in the step 126, the internal EGR failure flag FS_INEGRFAIL is set to 1 so as to indicate the fact, followed by terminating the present process.

If the answer to the question of the step 120 is negative (NO), it is determined in a step 128 whether or not the external EGR ratio EGRDIVEX is equal to a value of 1.0 (first predetermined value). If the answer to the question is affirmative (YES), i.e. if only the external EGR is being performed, the process proceeds to a step 129, wherein the external EGR-associated learned value KEGRREFEX is calculated by weighted averaging expressed by the following equation (11):

$$KEGRREFEX = CREFEGREX \cdot KEGRFB + (1 - CREFEGREX) \cdot KEGRREFEXZ \qquad (11)$$

wherein KEGRREFEXZ represents the immediately preceding value of the external EGR-associated learned value KEGRREFEX, and CREFEGREX a predetermined weighting coefficient set between a value of 0 and a value of 1.0.

Then, in steps 130 to 135, limit checking of the external EGR-associated learned value KEGRREFEX is carried out in the same manner as in the steps 122 to 127. First, in the step 130, it is determined whether the external EGR-associated learned value KEGRREFEX is not larger than a predetermined lower limit value KEGRREFEXLL. If the answer to the question is negative (NO), the process proceeds to a step 131, wherein it is determined whether the external EGR-associated learned value KEGRREFEX is not smaller than a predetermined upper limit value KEGRREFEXLH.

If the answer to the question is negative (NO), i.e. if KEGRREFEXLL<KEGRREFEX<KEGRREFEXLH holds, it is determined that the external EGR is being normally performed, so that in a step 132, the external EGR failure flag FS_EXEGRFAIL is set to 0 so as to indicate the fact, followed by terminating the present process.

On the other hand, if the answer to the question of the step 131 is affirmative (YES), i.e. if KEGRREFEX≧KEGRREFEXLH holds, the external EGR-associated learned value KEGRREFEX is set to the upper limit value KEGRREFEXLH in a step 133. Then, it is determined that the external EGR is not being normally performed, so that in a step 134, the external EGR failure flag FS_EXEGRFAIL is set to 1 so as to indicate the fact, followed by terminating the present process.

If the answer to the question of the step 130 is affirmative (YES), i.e. if KEGRREFEX≦KEGRREFEXLL holds, the external EGR-associated learned value KEGRREFEX is set to the lower limit value KEGRREFEXLL in the step 135. Then, it is determined that the external EGR is not being normally performed, so that in the step 134, the external EGR failure flag FS_EXEGRFAIL is set to 1 so as to indicate the fact, followed by terminating the present process.

If the answer to the question of the step 128 is negative (NO), i.e. if both the internal EGR and the external EGR are being performed, the process is immediately terminated. In short, in this case, neither the internal EGR-associated learned value KEGRREFIN nor the external EGR-associated learned value KEGRREFEX is calculated.

As described above, in the process for calculating the learned values KEGRREFIN and KEGRREFEX, the two learned values KEGRREFIN and KEGRREFEX are calculated, and when EGRDIVEX=1.0 holds to execute the external EGR alone, if the learned value KEGRREFEX for the external EGR is not within a first predetermined range (KEGRREFEXLL<KEGRREFEX<KEGRREFEXLH) defined by the upper and lower limit values KEGRREFEXLH and KEGRREFEXLL, it is determined that the external EGR is not being normally executed. That is, it is determined that the exhaust recirculation mechanism 16 is faulty.

Further, when EGRDIVIN=1.0 holds to execute the internal EGR alone, if the learned value KEGRREFIN for the internal EGR is not within a second predetermined range (KEGRREFINLL<KEGRREFIN<KEGRREFINLH) defined by the upper and lower limit values KEGRREFINLH and KEGRREFINLL, it is determined that the internal EGR is not being normally executed. That is, it is determined that at least one of the three variable mechanisms 50, 70, and 90 is faulty.

Figure 31:
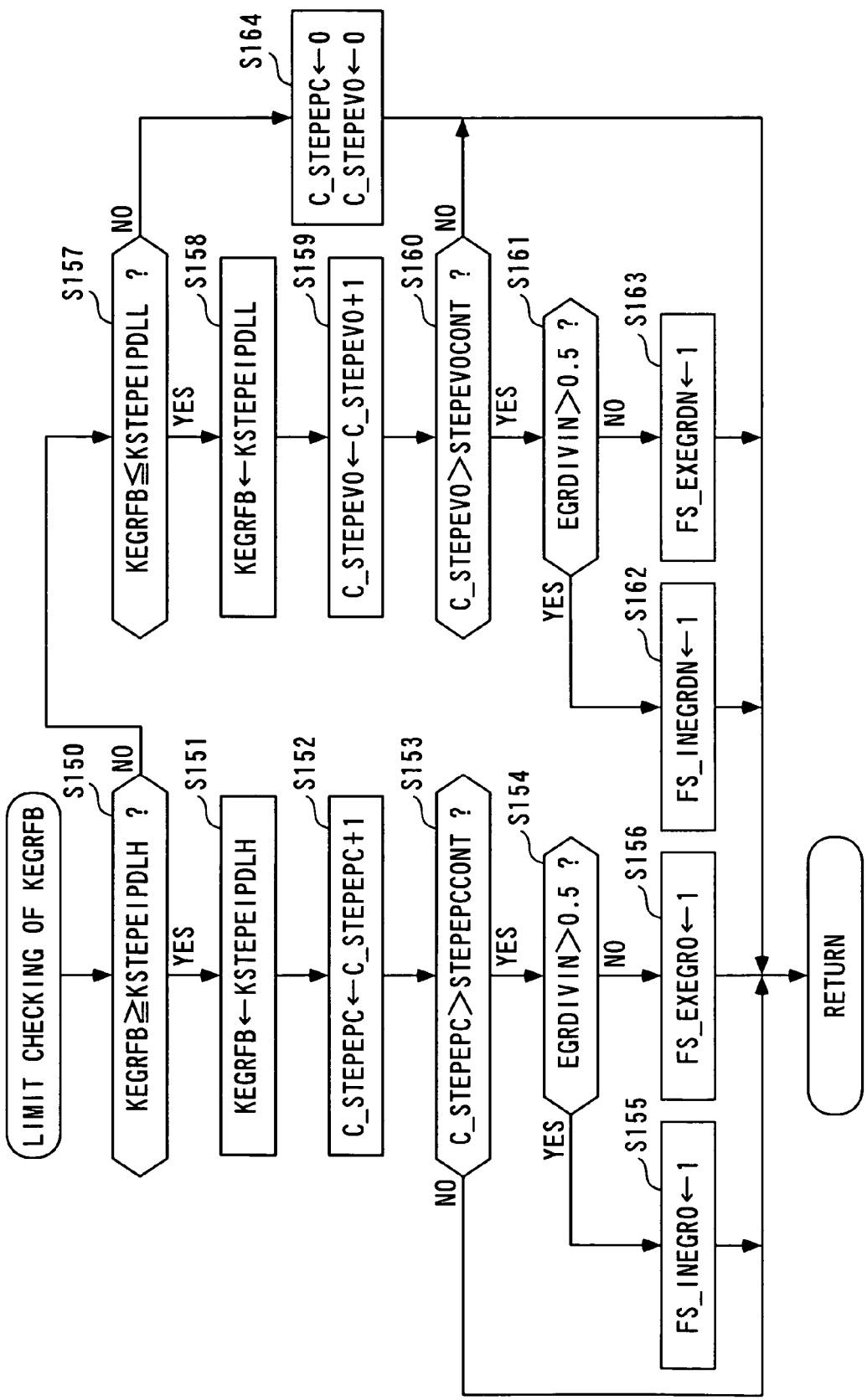
FIG. 31 is a flowchart of a limit-checking process for the feedback correction coefficient KEGRFB.

Hereafter, the process carried out in the step 108 in FIG. 28 for limit checking of the FB correction coefficient KEGRFB will be described with reference to FIG. 31. In the present process, first, it is determined in a step 150 whether or not the FB correction coefficient KEGRFB is not smaller than a predetermined upper limit value KSTEPEIPDLH. If the answer to the question is affirmative (YES), the process proceeds to a step 151, wherein the FB correction coefficient KEGRFB is set to the upper limit value KSTEPEIPDLH. Thereafter, in a step 152, a counter value C_STEPEPC for use in determining a too large EGR failure is incremented.

Then, the process proceeds to a step 153, wherein it is determined whether or not the counter value C_STEPEPC has exceeded a predetermined value STEPEPCCONT. If the answer to the question is negative (NO), the present process is immediately terminated. On the other hand, if the answer to the question is affirmative (YES), i.e. if the number of times the FB correction coefficient KEGRFB has become equal to or larger than the upper limit value KSTEPEIPDLH has exceeded a predetermined count, it is determined that the too large EGR failure has occurred in which the EGR amount is stuck at a too large state, so that the process proceeds to a step 154, wherein it is determined whether or not the internal EGR ratio EGRDIVIN is larger than 0.5.

If the answer to the question is affirmative (YES), i.e. if the internal EGR amount is larger than the external EGR amount, it is determined that the failure is on the internal EGR side, so that the process proceeds to a step 155, wherein the too large internal EGR failure flag FS_INEGRO is set to 1 so as to indicate the fact, followed by terminating the present process.

On the other hand, if the answer to the question of the step 154 is negative (NO), i.e. if the external EGR amount is not smaller than the internal EGR amount, it is determined that the failure is on the external EGR side, so that the process proceeds to a step 156, wherein the too large external EGR failure flag FS_EXEGRO is set to 1 so as to indicate the fact, followed by terminating the present process.

If the answer to the question of the step 150 is negative (NO), it is determined in a step 157 whether the FB correction coefficient KEGRFB is not larger than a predetermined lower limit value KSTEPEIPDLL. If the answer to the question is affirmative (YES), the process proceeds to a step 158, wherein the FB correction coefficient KEGRFB is set to the lower limit value KSTEPEIPDLL. Then, in a step 159, a counter value C_STEPEVO for use in determining a too small EGR failure is incremented.

Next, the process proceeds to a step 160, wherein it is determined whether or not the counter value C_STEPEVO has exceeded a predetermined value STEPEVOCONT. If the answer to the question is negative (NO), the present process is immediately terminated. On the other hand, if the answer to the question is affirmative (YES), i.e. if the number of times the FB correction coefficient KEGRFB has become equal to or smaller than the lower limit value KSTEPEIPDLL has exceeded a predetermined count, it is determined that the too small EGR failure has occurred in which the EGR amount is stuck at a too small state, so that the process proceeds to a step 161, wherein it is determined whether or not the internal EGR ratio EGRDIVIN is larger than a value of 0.5.

If the answer to the question is affirmative (YES), i.e. if the internal EGR amount is larger than the external EGR amount, it is determined that the failure is on the internal EGR side, so that in a step 162, the too small internal EGR failure flag FS_INEGRDN is set to 1 so as to indicate the fact, followed by terminating the present process.

On the other hand, if the answer to the question of the step 161 is negative (NO), i.e. if the external EGR amount is not smaller than the internal EGR amount, it is determined that the failure is on the external EGR side, so that in a step 163, the too small external EGR failure flag FS_EXEGRDN is set to 1 so as to indicate the fact, followed by terminating the present process.

If the answer to the question of the step 157 is negative (NO), i.e. if KSTEPEIPDLL<KEGRFB<KSTEPEIPDLH holds, the counter value C_STEPEPC for use in determining the too large EGR failure and the counter value C_STEPEVO for use in determining the too small EGR failure are both reset to 0 in a step 164, followed by terminating the present process.

As described above, in the limit checking process for the FB correction coefficient KEGRFB, when both KSTEPEIPDLH≦KEGRFB and C_STEPEPC>STEPEPCCONT hold, if EGRDIVIN>0.5 holds, it is determined that the too large EGR failure is on the internal EGR side, whereas if EGRDIVIN≦0.5 holds, it is determined that the too large EGR failure is on the external EGR side. Further, when both KEGRFB≦KSTEPEIPDLL and C_STEPEVO>STEPEVOCONT hold, if EGRDIVIN>0.5 holds, it is determined that the too small EGR failure is on the internal EGR side, whereas if EGRDIVIN≦0.5 holds, it is determined that the too small EGR failure is on the external EGR side.

More specifically, when a state in which the FB correction coefficient KEGRFB is not within the predetermined range (KEGRREFEXLL<KEGRREFEX<KEGRREFEXLH) has continued for a predetermined time period (corresponding to the predetermined value STEPEVOCONT or a time period corresponding to the predetermined value STEPEVOCONT), if the internal EGR ratio EGRDIVIN is larger than the external EGR ratio EGRDIVEX, it is determined that at least one of the three variable mechanisms 50, 70, and 90 is faulty, whereas if the external EGR ratio EGRDIVEX is not smaller than the internal EGR ratio EGRDIVIN, it is determined that the exhaust recirculation mechanism 16 is faulty.

Figure 32:
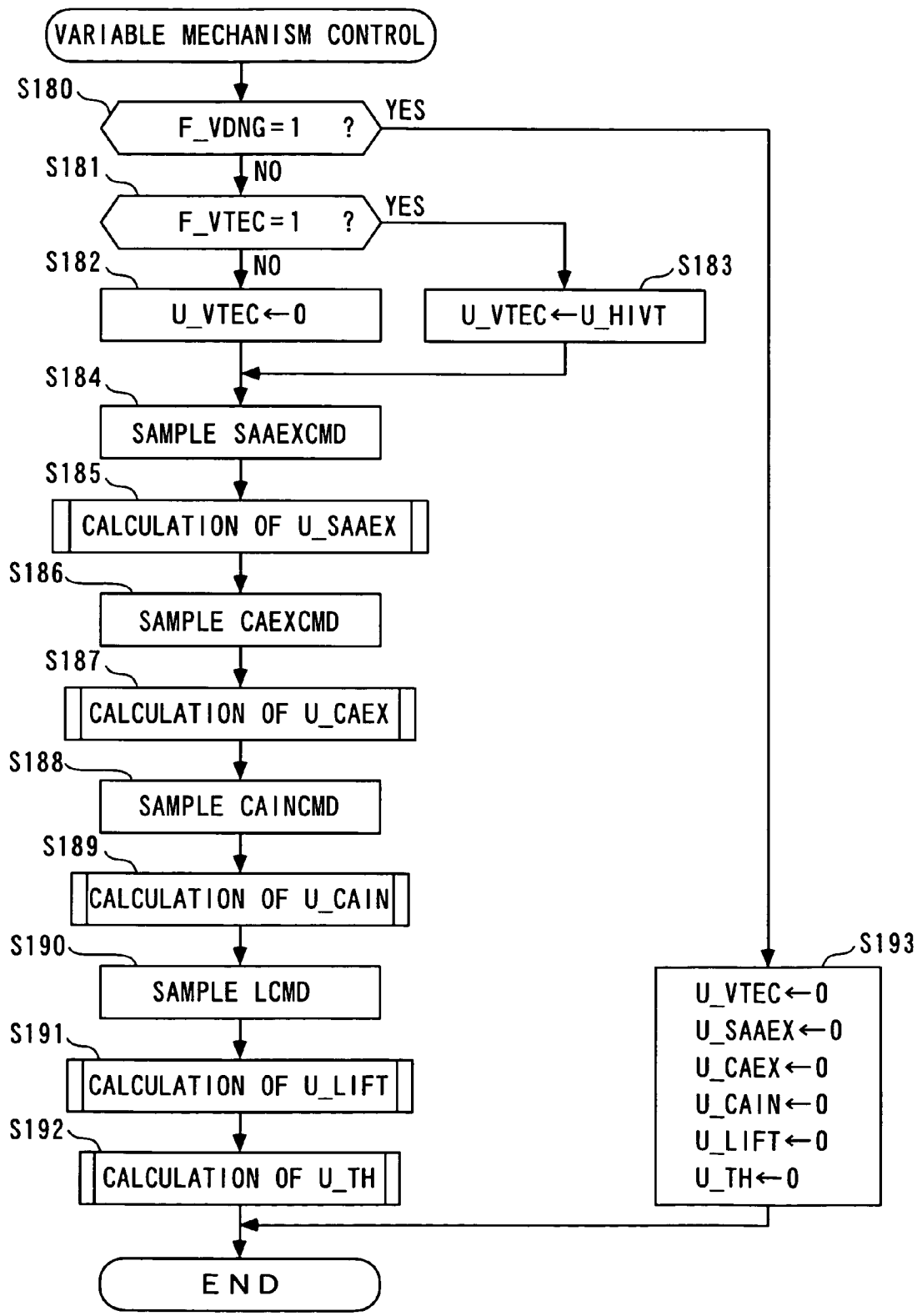
FIG. 32 is a flowchart of a process for controlling variable mechanisms.

Hereafter, a process for controlling the six variable mechanisms in the present embodiment, i.e. the throttle valve mechanism 13, the exhaust gas recirculation mechanism 16, the intake lift switching mechanism 41, the variable intake cam phase mechanism 50, the variable exhaust lift mechanism 70, and the variable exhaust cam phase mechanism 90 will be described with reference to FIG. 32. This process is specifically for calculating the six control inputs U_VTEC, U_SAAEX, U_CAEX, U_CAIN, U_LIFT, and U_TH for controlling the respective six variable mechanisms, as described below. The present process is carried out at intervals of a predetermined time period (e.g. 10 msec) set by a timer.

In the present process, first, it is determined in a step 180 whether or not a variable mechanism failure flag F_VDNG is equal to 1. The variable mechanism failure flag F_VDNG is set to 1 when it is determined, based on the values of the respective failure flags and the like, that at least one of the six variable mechanisms 13, 16, 41, 50, 70, and 90 is faulty.

If the answer to the question of the step 180 is negative (NO), i.e. if the variable mechanisms are all normal, the process proceeds to a step 181, wherein it is determined whether or not the intake lift flag F_VTEC is equal to 1. If the answer to the question is negative (NO), i.e. if the intake lift switching mechanism 41 has been set to the low-lift mode, the process proceeds to a step 182, wherein the intake lift control input U_VTEC is set to a value of 0.

On the other hand, if the answer to the question of the step 181 is affirmative (YES), i.e. if the intake lift switching mechanism 41 has been set to the high-lift mode, the process proceeds to a step 183, wherein the intake lift control input U_VTEC is set to a predetermined value U_HIVT for the high-lift mode.

Figure 23:
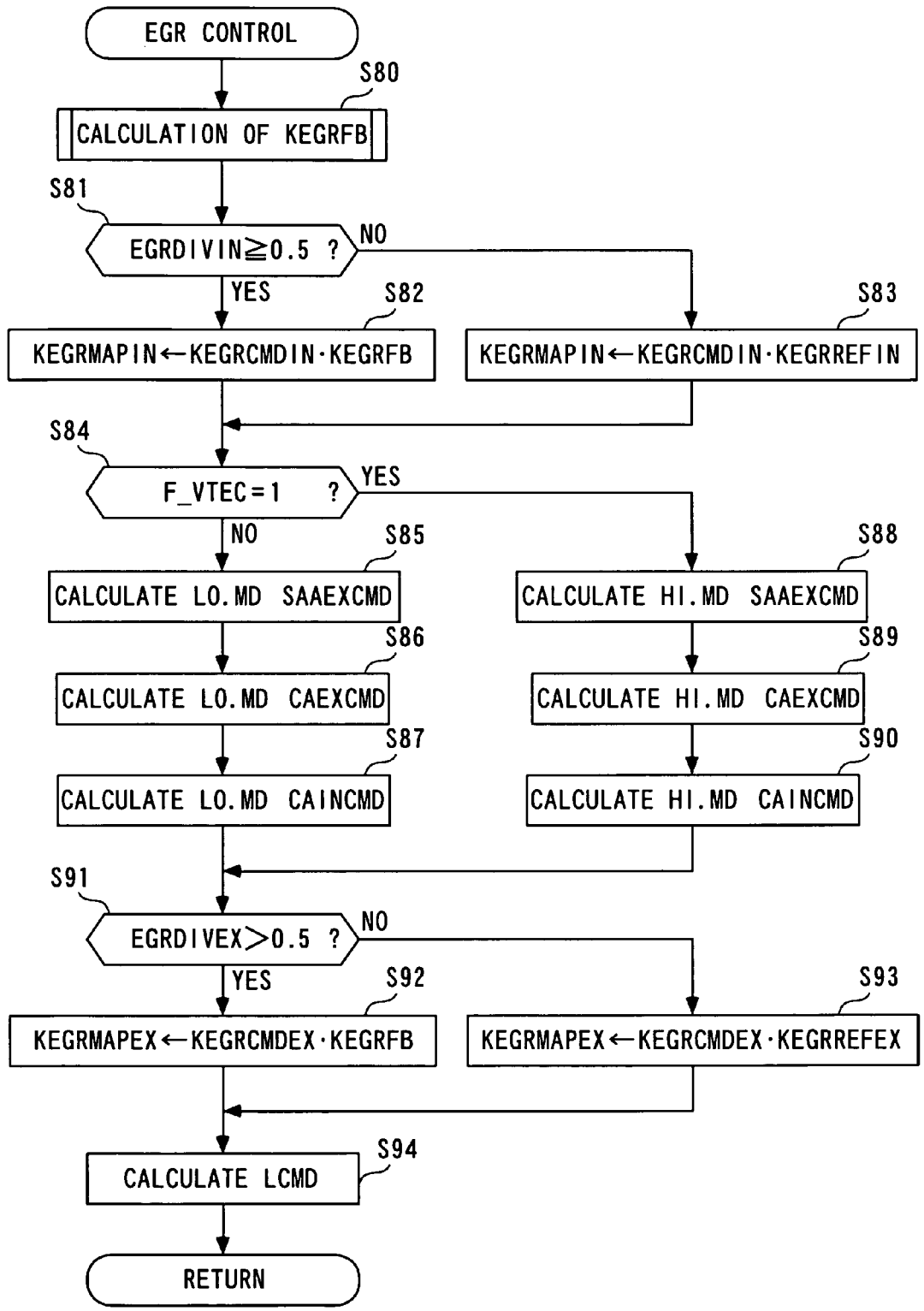
FIG. 23 is a flowchart of an EGR control process.

In a step 184 following the step 182 or 183, the target turning angle SAAEXCMD calculated in the step 85 or 88 in FIG. 23 is sampled. Thereafter, the process proceeds to a step 185, wherein an exhaust lift control input U_SAAEX for controlling the variable exhaust lift mechanism 70 is calculated based on the target turning angle SAAEXCMD and the turning angle SAAEX. More specifically, the exhaust lift control input U_SAAEX is calculated with a predetermined feedback control algorithm (e.g. a PID control algorithm or a response-specifying control algorithm) such that the turning angle SAAEX is caused to converge to the target turning angle SAAEXCMD.

Then, in a step 186, the target exhaust cam phase CAEXCMD calculated in the step 86 or 89 in FIG. 23 is sampled. Thereafter, the process proceeds to a step 187, wherein the exhaust phase control input U_CAEX for controlling the variable exhaust cam phase mechanism 90 is calculated in the same manner as in the step 185. More specifically, the exhaust phase control input U_CAEX is calculated with a predetermined feedback control algorithm such that the exhaust cam phase CAEX is caused to converge to the target exhaust cam phase CAEXCMD.

In a step 188 following the step 187, the target intake cam phase CAINCMD calculated in the step 87 or 90 in FIG. 23 is sampled. Thereafter, the process proceeds to a step 189, wherein the intake phase control input U_CAIN for controlling the variable intake cam phase mechanism 50 is calculated in the same manner as in the step 185 or 187. More specifically, the intake phase control input U_CAIN is calculated with a predetermined feedback control algorithm such that the intake cam phase CAIN is caused to converge to the target intake cam phase CAINCMD.

Then, the process proceeds to a step 190, wherein the target EGR lift LCMD calculated in the step 94 in FIG. 23 is sampled. Thereafter, in a step 191, the EGR lift control input U_LIFT for controlling the exhaust gas recirculation mechanism 16 is calculated in the same manner as in the step 185, 187, or 189. More specifically, the EGR lift control input U_LIFT is calculated with a predetermined feedback control algorithm such that the EGR lift LACT is caused to converge to the target EGR lift LCMD.

Then, the process proceeds to a step 192, wherein the TH control input U_TH for controlling the throttle valve mechanism 13 is calculated in the same manner as in the step 185, 187, 189, or 191. More specifically, a target throttle valve opening THCMD is calculated by searching a map, not shown, according to the demanded torque PMCMD and the engine speed NE, and the TH control input U_TH is calculated with a predetermined feedback control algorithm such that the throttle valve opening TH is caused to converge to the target throttle valve opening THCMD. The TH control input U_TH is thus calculated in the step 192, followed by terminating the present process.

If the answer to the question of the step 180 is affirmative (YES), i.e. if at least one of the six variable mechanisms is faulty, the process proceeds to a step 193, wherein the six control inputs U_VTEC, U_SAAEX, U_CAEX, U_CAIN, U_LIFT, and U_TH are each set to 0, followed by terminating the present process. When all the six control inputs are thus set to 0, a predetermined intake air amount and a predetermined exhaust state are secured, whereby it is made possible not only to carry out idling or starting of the engine 3 during stoppage of the vehicle, but also to continue low-speed traveling during traveling of the vehicle.

As described hereinabove, according to the EGR failure determination system 1 of the present embodiment, the exhaust recirculation mechanism 16 is controlled according to the FB correction coefficient KEGRFB and the external EGR ratio EGRDIVEX, whereby the external EGR amount is controlled. Further, the three variable mechanisms 50, 70, and 90 are controlled according to the FB correction coefficient KEGRFB and the internal EGR ratio EGRDIVIN, whereby the internal EGR amount is controlled. Further, when KEGRFB≧KSTEPEIPDLH or KEGRFB≦KSTEPEIPDLL holds, if EGRDIVIN≦0.5 holds (i.e. EGRDIVEX≧EGRDIVIN holds), it is determined that the exhaust recirculation mechanism 16 is faulty, and therefore the too large EGR failure of the external EGR amount or the too small EGR failure thereof has occurred, whereas if EGRDIVIN>0.5 holds (i.e. EGRDIVIN>EGRDIVEX holds), it is determined that at least one of the three variable mechanisms 50, 70, and 90 is faulty, and therefore the too large EGR failure of the internal EGR amount or the too small EGR failure thereof has occurred.

The FB correction coefficient KEGRFB is calculated such that the actual fresh air ratio KEGR is caused to converge to the target value KEGRCMD, and hence differently from the conventional EGR failure determination system which compares the absolute value of the difference between an EGR opening and a target EGR opening with a predetermined value, it is possible to accurately determine failures of the exhaust recirculation mechanism 16 and the three variable mechanisms 50, 70, and 90 even when the EGR amount is small. That is, irrespective of whether the EGR amount is large or small, it is possible to accurately determine the failures of the four variable mechanisms 16, 50, 70, and 90, thereby making it possible to enhance marketability of the system.

Further, by comparing the values of the two EGR ratios EGRDIVIN and EGRDIVEX with each other, it is possible to accurately identify which is fault, the three variable mechanisms 50, 70, and 90 for varying the internal EGR amount or the exhaust recirculation mechanism 16 for varying the external EGR amount. That is, differently from the conventional EGR failure determination system, it is possible to accurately identify which is faulty, the mechanisms for varying the internal EGR amount or the mechanism for varying the external EGR amount, thereby making it possible to enhance workability during maintenance.

Furthermore, when KEGRFB≧KSTEPEIPDLH holds and at the same time C_STEPEPC>STEPEPCCONT holds, that is, only after a state in which KEGRFB≧KSTEPEIPDLH holds has continued longer than a predetermined time period, it is determined that the too large EGR amount failure has occurred in which the EGR amount is stuck at a too large state, so that it is possible to avoid erroneously determining that the too large EGR failure has occurred, even if the FB correction coefficient KEGRFB has temporarily become equal to or larger than the upper limit value KSTEPEIPDLH e.g. due to a computation error. Similarly, when KEGRFB≦KSTEPEIPDLL holds and at the same time C_STEPEVO>STEPEVOCONT holds, that is, only after a state in which KEGRFB≦KSTEPEIPDLL holds has continued longer than a predetermined time period, it is determined that the too small EGR amount failure has occurred in which the EGR amount is stuck at a too small state, so that it is possible to avoid erroneously determining that the too small EGR failure has occurred even if the FB correction coefficient KEGRFB has temporarily become equal to or smaller than the lower limit value KSTEPEIPDLL e.g. due to a computation error. Thus, it is possible to further enhance the accuracy of the failure determination.

Furthermore, when the learned value KEGRREFEX for the external EGR is not within the first predetermined range (KEGRREFEXLL<KEGRREFEX<KEGRREFEXLH), it is determined that the exhaust recirculation mechanism 16 is faulty, and when the learned value KEGRREFIN for the internal EGR is not within the second predetermined range (KEGRREFINLL<KEGRREFIN<KEGRREFINLH), it is determined that at least one of the three variable mechanisms 50, 70, and 90 is faulty. The learned value KEGRREFEX for the external EGR is calculated when EGRDIVEX=1.0 holds to execute the external EGR alone, and the learned value KEGRREFIN for the internal EGR is calculated when EGRDIVIN=1.0 holds to execute the internal EGR alone. This makes it possible to accurately identify which is faulty, the exhaust recirculation mechanism 16 or the three variable mechanisms 50, 70, and 90. Furthermore, since the two learned values KEGRREFEX and KEGRREFIN are both calculated by weighted averaging of the FB correction coefficients KEGRFB, it is possible to avoid erroneously determining that the EGR failure has occurred even if the FB correction coefficient KEGRFB has temporarily become too large or too small e.g. due to a computation error.

As described above, it is possible to determine the failures of the exhaust recirculation mechanism 16 and the three vari-able mechanisms 50, 70, and 90 by the two different failure determination methods and identify which is faulty, the mechanism for performing the external EGR or the mechanisms for performing the internal EGR. As a result, it is possible to perform the failure determination more accurately to thereby further enhance the accuracy of the failure determination.

Further, when the EGR normal flag F_EGROK is set to 0 based on the determination that the exhaust recirculation mechanism 16 or at least one of the three variable mechanisms 50, 70, and 90 is faulty, the compression ignition combustion flag F_HCCI is set to 0 to inhibit the compression ignition combustion operation but execute the spark ignition combustion operation. This makes it possible to secure excellent combustion of the mixture by spark ignition while avoiding the combustion of the mixture from being degraded du to incapability of proper control of the temperature of each cylinder 3a due to the EGR failure. This makes it possible to reduce exhaust emissions and enhance drivability.

It should be noted that although in the above-described embodiment, the variable intake cam phase mechanism 50, the variable exhaust lift mechanism 70, and the variable exhaust cam phase mechanism 90 for changing the amount of combustion gases caused to remain in the cylinder 3a are used as the internal EGR device, this is not limitative, but the internal EGR device according to the present invention may be any device insofar as it is capable of changing the amount of combustion gases caused to remain in the cylinder 3a. For example, there may be used a device which is capable of recirculating combustion gases via a recirculation passage through the cylinder head 3c as higher-temperature exhaust gases than external EGR gases, to thereby cause the combustion gases to remain in the cylinder 3a, and changing the recirculation amount of the combustion gases.

Further, although in the present embodiment, the actual fresh air ratio KEGR is used as the EGR rate parameter, by way of example, this is not limitative, but any parameter may be used as the EGR rate parameter insofar as it is indicative of the ratio of the total EGR amount to the total gas amount. For example, the EGR rate as a value obtained by subtracting the actual fresh air ratio KEGR from a value of 1 may be used as the EGR rate parameter.

Although in the present embodiment, a value of 1.0 is used as the first predetermined value for comparison with the external EGR ratio EGRDIVEX, this is not limitative, but the first predetermined value can be set to any value within a range larger than a value of 0.5 and equal to or smaller than a value of 1.0. Similarly, although a value of 1.0 is used as the second predetermined value for comparison with the internal EGR ratio EGRDIVIN, by way of example, this is not limitative, but the second predetermined value can be set to any value within a range larger than a value of 0.5 and equal to or smaller than a value of 1.0.

Further, although in the present embodiment, when both KSTEPEIPDLH≦KEGRFB and C_STEPEPC>STEPEPCCONT hold, it is determined that the too large EGR failure of the EGR amount has occurred, and when both KEGRFB≦KSTEPEIPDLL and C_STEPEVO>STEPEVOCONT hold, it is determined that the too small EGR failure of the EGR amount has occurred, this is not limitative, but it may be determined that the too large EGR failure of the EGR amount has occurred when KSTEPEIPDLH≦KEGRFB alone holds, and that the too small EGR failure of the EGR amount has occurred when KEGRFB≦KSTEPEIPDLL alone holds. That is, in the process shown in FIG. 31, the steps 152, 153, 159, 160, and 164 may be omitted.

Furthermore, although in the present embodiment, if the answer to the question of the step 153 or the step 160 is affirmative (YES), it is determined which is faulty, the exhaust recirculation mechanism 16 or the three variable mechanisms 50, 70, and 90, according to the value of the internal EGR ratio EGRDIVIN, by way of example, this is not limitative, but if the answer to the question of the step 153 or the step 160 is affirmative (YES), it may be determined that both of the exhaust recirculation mechanism 16 and at least one of the three variable mechanisms 50, 70, and 90 are faulty.

Further, although in the present embodiment, the accelerator pedal opening AP, the engine speed NE, the fresh air flow rate GIN, the intake pipe pressure PBA, and so forth are used as the first operating condition parameter, this is not limitative, but any parameter may be used as the first operating condition parameter insofar as it is indicative of an operating condition of the engine 3. For example, the engine coolant temperature TW may be used.

Furthermore, although in the present embodiment, the accelerator pedal opening AP and the engine speed NE are used as the second operating condition parameter, this is not limitative, but any parameter may be used as the second operating condition parameter insofar as it is indicative of an operating condition of the engine 3. For example, the intake fresh air amount GAIRCYL and the intake pipe pressure PBA may be used.

According to the control system 1 of the present embodiment, the target air-fuel ratio KCMD is normally calculated as the map value KCMDMAP determined by searching a map according to the demanded torque PMCMD and the engine speed NE, whereas when the too small EGR failure on the external EGR side has occurred, the target air-fuel ratio KCMD is set to the product KCMDMAP·KEGRCMD of its map value and the target value of the actual fresh air ratio KEGR. Further, the fuel injection amount TOUT is controlled such that the actual air-fuel ratio KACT converges to the target air-fuel ratio KCMD. That is, the air-fuel ratio control is carried out.

When the external EGR amount is too small due to a failure of the exhaust recirculation mechanism 16, as described above, the target air-fuel ratio KCMD may be set to a leaner value than when the exhaust recirculation mechanism 16 is normal to supply a leaner mixture to the cylinder 3a than when the exhaust recirculation mechanism 16 is normal, whereby differently from the conventional control system, it is possible to suppress occurrence of knocking. Particularly even during high-load operation of the engine 3, occurrence of knocking can be suppressed.

In addition, when the too small EGR failure on the external EGR side has occurred, the demanded torque PMCMD is set to a predetermined limit value PMEXEGRLMT, and the limit value PMEXEGRLMT is configured in advance such that the map value KCMDMAP of the target air-fuel ratio, determined by searching a map according to the limit value PMEXEGRLMT, becomes a leaner value. This makes it possible to positively set the target air-fuel ratio KCMD for use in the occurrence of the too small EGR failure on the external EGR side to such a leaner value as will make it difficult to cause knocking. As a consequence, it is possible to suppress occurrence of knocking more positively even during high-load operation of the engine 3.

Furthermore, when the too small EGR failure on the external EGR side has occurred, the target air-fuel ratio KCMD is set to the product KCMDMAP·KEGRCMD of its map value and the target value KEGRCMD of the actual fresh air ratio. The target value KEGRCMD is a value as a target of the actual fresh air ratio KEGR, and is set such that 0<KEGRCMD≦1 holds. This makes it possible to set the target air-fuel ratio KCMD to such a leaner value as will make it possible to positively make up for shortage of the external EGR amount, thereby making it possible to suppress occurrence of knocking still more positively. From the above, it is possible to further enhance drivability.

Further, although in the present embodiment, the exhaust recirculation mechanism 16 is used as the external EGR device, by way of example, this is not limitative, but the external EGR device may be any device insofar as it recirculates lower-temperature exhaust gases than internal EGR gases into the cylinder 3a.

Furthermore, although in the present embodiment, the failure-time target air-fuel ratio is set to the product KCMDMAP·KEGRCMD of the map value of the target air-fuel ratio and the target value of the actual fresh air ratio, by way of example, this is not limitative, but the method of calculating the failure-time target air-fuel ratio, according to the present invention, may be any method insofar as it calculates the failure-time target air-fuel ratio according to the map value KCMDMAP of the target air-fuel ratio and the target value KEGRCMD of the actual fresh air ratio. For example, the failure-time target air-fuel ratio may be calculated by searching a map according to the map value KCMDMAP of the target air-fuel ratio and the target value KEGRCMD of the actual fresh air ratio.

Further, although in the present embodiment, the target value KEGRCMD of the actual fresh air ratio is used as the target EGR rate parameter, by way of example, this is not limitative, but the target EGR rate parameter may be any value insofar as it serves as a target of a value indicative of the ratio of the total EGR amount to the total gas amount. For example, a value obtained by subtracting the target value KEGRCMD of the actual fresh air ratio KEGR from a value of 1 may be used as the target EGR rate parameter.

It is further understood by those skilled in the art that the foregoing are preferred embodiments of the invention, and that various changes and modifications may be made without departing from the spirit and scope thereof.

What is claimed is:

1. An EGR failure determination system for an internal combustion engine including an external EGR device that recirculates exhaust gases emitted from a cylinder into the cylinder and changes a recirculation amount of the exhaust gases, and an internal EGR device that causes combustion gases generated in the cylinder to remain as a high-temperature gas higher in temperature than the exhaust gases and changes a remaining amount of the combustion gases, the EGR failure determination system determining failures of the external EGR device and the internal EGR device, comprising:

EGR rate parameter-calculating means for calculating an EGR rate parameter indicative of a ratio of a total EGR amount which is a sum of an amount of the exhaust gases recirculated into the cylinder and an amount of the combustion gases remaining in the cylinder, to a total gas amount which is a sum of the total EGR amount and an amount of fresh air drawn into the cylinder, according to a first operating condition parameter indicative of an operating condition of the engine;

target value-setting means for setting a target value as a target of the EGR rate parameter;

EGR control value-calculating means for calculating an EGR control value according to the EGR rate parameter and the target value;

control means for controlling the external EGR device and the internal EGR device according to the EGR control value; and failure determination means for determining that at least one of the external EGR device and the internal EGR device is faulty when the EGR control value is not within a predetermined range.

2. An EGR failure determination system as claimed in claim 1, further comprising EGR ratio-setting means for setting a ratio of an amount of exhaust gases to be recirculated into the cylinder by the external EGR device to the total EGR amount, as an external EGR ratio, and a ratio of an amount of combustion gases to be caused to remain in the cylinder by the internal EGR device to the total EGR amount, as an internal EGR ratio, according to a second operating condition parameter indicative of an operating condition of the engine, wherein said control means controls the external EGR device further according to the external EGR ratio and controls the internal EGR device further according to the internal EGR ratio, and wherein when the EGR control value is not within the predetermined range, if the external EGR ratio is larger than the internal EGR ratio, said failure determination means determines that the external EGR device is faulty, whereas if the internal EGR ratio is larger than the external EGR ratio, said failure determination means determines that the internal EGR device is faulty.

3. An EGR failure determination system as claimed in claim 2, further comprising learned value-calculating means for calculating a learned value of the EGR control value for external EGR, when the external EGR ratio is larger than the internal EGR ratio and at the same time not smaller than a first predetermined value, and calculating a learned value of the EGR control value for internal EGR, when the internal EGR ratio is larger than the external EGR ratio and at the same time not smaller than a second predetermined value, and wherein said failure determination means determines that the external EGR device is faulty, when the calculated learned value of the EGR control value for external EGR is not within a first predetermined range, and determines that the internal EGR device is faulty, when the calculated learned value of the EGR control value for internal EGR is not within a second predetermined range.

4. An EGR failure determination system for an internal combustion engine including an external EGR device that recirculates exhaust gases emitted from a cylinder into the cylinder and changes a recirculation amount of the exhaust gases, and an internal EGR device that causes combustion gases generated in the cylinder to remain as a high-temperature gas higher in temperature than the exhaust gases and changes a remaining amount of the combustion gases, the EGR failure determination system determining failures of the external EGR device and the internal EGR device, comprising:

EGR rate parameter-calculating means for calculating an EGR rate parameter indicative of a ratio of a total EGR amount which is a sum of an amount of the exhaust gases recirculated into the cylinder and an amount of the combustion gases remaining in the cylinder, to a total gas amount which is a sum of the total EGR amount and an amount of fresh air drawn into the cylinder, according to a first operating condition parameter indicative of an operating condition of the engine;

target value-setting means for setting a target value as a target of the EGR rate parameter;

EGR control value-calculating means for calculating an EGR control value according to the EGR rate parameter and the target value;

EGR ratio-setting means for setting a ratio of an amount of exhaust gases to be recirculated into the cylinder by the external EGR device to the total EGR amount, as an external EGR ratio, and a ratio of an amount of combustion gases to be caused to remain in the cylinder by the internal EGR device to the total EGR amount, as an internal EGR ratio, according to a second operating condition parameter indicative of an operating condition of the engine, control means for controlling the external EGR device according to the EGR control value and the external EGR ratio, and controlling the internal EGR device according to the EGR control value and the internal EGR ratio;

learned value-calculating means for calculating a learned value of the EGR control value for external EGR, when the external EGR ratio is larger than the internal EGR ratio and at the same time not smaller than a first predetermined value, and calculating a learned value of the EGR control value for internal EGR, when the internal EGR ratio is larger than the external EGR ratio and at the same time not smaller than a second predetermined value; and failure determination means for determining that the external EGR device is faulty, when the calculated learned value of the EGR control value for external EGR is not within a first predetermined range, and determining that the internal EGR device is faulty, when the calculated learned value of the EGR control value for internal EGR is not within a second predetermined range.

5. An EGR failure determination system as claimed in any one of claims 1 to 4, wherein the engine is formed by an engine capable of performing at least compression ignition combustion operation, the EGR failure determination system further comprising inhibiting means for inhibiting the compression ignition combustion operation of the engine when said failure determination means has determined that at least one of the external EGR device and the internal EGR device is faulty.

6. A control system for an internal combustion engine including an external EGR device that recirculates exhaust gases emitted from a cylinder into the cylinder and changes a recirculation amount of the exhaust gases, and an internal EGR device that causes combustion gases generated in the cylinder to remain as a high-temperature gas higher in temperature than the exhaust gases and changes a remaining amount of the combustion gases, comprising:

EGR control means for controlling the external EGR device and the internal EGR device, according to a first operating condition parameter indicative of an operating condition of the engine;

external EGR failure determination means for determining whether or not a failure in which the recirculation amount of the exhaust becomes smaller has occurred in the external EGR device;

target air-fuel ratio-setting means for setting a target air-fuel ratio as a target of an air-fuel ratio of a mixture in the engine according to a second operating condition parameter indicative of an operating condition of the engine, and setting the target air-fuel ratio to a failure-time target air-fuel ratio leaner than a value set according to the second operating condition parameter, when said external EGR failure determination means determines that the external EGR device is faulty; and air-fuel ratio control means for controlling the air-fuel ratio of the mixture according to the set target air-fuel ratio.

7. A control system as claimed in claim 6, wherein said EGR control means comprises:

target EGR rate parameter-setting means for setting a target EGR rate parameter which serves as a target of a value indicative of a ratio of a total EGR amount which is a sum of an amount of the exhaust gases recirculated into the cylinder and an amount of the combustion gases remaining in the cylinder, to a total gas amount which is a sum of the total EGR amount and an amount of fresh air drawn into the cylinder, according to the first operating condition parameter;

EGR control value-calculating means for calculating an EGR control value for controlling the external EGR device and the internal EGR device according to the set target EGR rate parameter; and EGR ratio-setting means for setting a ratio of an amount of exhaust gases to be recirculated into the cylinder by the external EGR device to the total EGR amount as an external EGR ratio, and a ratio of an amount of combustion gases to be caused to remain in the cylinder by the internal EGR device to the total EGR amount as an internal EGR ratio, according to a third operating condition parameter indicative of an operating condition of the engine, and controls the external EGR device according to the external EGR ratio and the EGR control value, and controls the internal EGR device according to the internal EGR ratio and the EGR control value, and wherein when the EGR control value is not within a predetermined range, if the external EGR ratio is larger than the internal EGR ratio, said external EGR failure determination means determines that the failure in which the recirculation amount of the exhaust becomes smaller has occurred in the external EGR device.

8. A control system as claimed in claim 6, wherein said EGR control means includes target EGR rate parameter-setting means for setting a target EGR rate parameter which serves as a target of a value indicative of a ratio of a total EGR amount which is a sum of an amount of the exhaust gases recirculated into the cylinder and an amount of the combustion gases remaining in the cylinder, to a total gas amount which is a sum of the total EGR amount and an amount of fresh air drawn into the cylinder, according to the first operating condition parameter, and controls the external EGR device and the internal EGR device according to the set target EGR rate parameter, and wherein when said external EGR failure determination means has determined that the external EGR device is faulty, said target air-fuel ratio-setting means sets the failure-time target air-fuel ratio according to the target air-fuel ratio set according to the second operating condition parameter and the target EGR rate parameter.

9. A control system as claimed in claim 6, wherein said target air-fuel ratio-setting means includes demanded output-setting means for setting a demanded output of the engine according to the second operating condition parameter, and setting the demanded output to a predetermined limit value when said external EGR failure determination means has determined that the external EGR device is faulty, and said target air-fuel ratio-setting means sets the target air-fuel ratio according to the set demanded output, and when said external EGR failure determination means has determined that the external EGR device is faulty, sets the failure-time target air-fuel ratio according to the predetermined limit value.

* * * * *